United States Patent
Cronic et al.

(10) Patent No.: US 9,818,111 B2
(45) Date of Patent: Nov. 14, 2017

(54) MERCHANT-BASED TOKEN SHARING

(71) Applicant: Shift4 Corporation, Las Vegas, NV (US)

(72) Inventors: Kevin James Cronic, Las Vegas, NV (US); Steven Mark Sommers, Las Vegas, NV (US); John David Oder, II, Las Vegas, NV (US); John David Oder, Las Vegas, NV (US); Steven Calandrelli, Las Vegas, NV (US); Jeremy B. Fried, Las Vegas, NV (US)

(73) Assignee: Shift4 Corporation, Las Vegas, NV (US)

( * ) Notice: Subject to any disclaimer, the term of this patent is extended or adjusted under 35 U.S.C. 154(b) by 0 days.

(21) Appl. No.: 13/796,969

(22) Filed: Mar. 12, 2013

(65) Prior Publication Data

US 2013/0191286 A1   Jul. 25, 2013

Related U.S. Application Data

(63) Continuation-in-part of application No. 13/303,983, filed on Nov. 23, 2011, now Pat. No. 9,256,874.
(Continued)

(51) Int. Cl.
*G06Q 20/00* (2012.01)
*G06Q 20/38* (2012.01)
(Continued)

(52) U.S. Cl.
CPC ....... *G06Q 20/385* (2013.01); *G06Q 20/0855* (2013.01); *G06Q 20/24* (2013.01); *G06Q 20/3821* (2013.01); *G06Q 20/4014* (2013.01)

(58) Field of Classification Search
CPC .................................................. G06Q 20/385
(Continued)

(56) References Cited

U.S. PATENT DOCUMENTS

| 4,528,643 | A |   | 7/1985 | Freeny, Jr. |
|---|---|---|---|---|
| 5,961,593 | A | * | 10/1999 | Gabber et al. ............... 709/219 |

(Continued)

FOREIGN PATENT DOCUMENTS

| JP | 2006018692 | 1/2006 |
|---|---|---|
| JP | 2007233705 | 9/2007 |

(Continued)

OTHER PUBLICATIONS

E. Hammer, et al., The OAuth 2.0 Authorization Protocol draft-eitf-oauth, IETF Trust, Mar. 8, 2012, 44 pages.
(Continued)

*Primary Examiner* — Steven S Kim
(74) *Attorney, Agent, or Firm* — Knobbe, Martens, Olson & Bear, LLP

(57) ABSTRACT

One embodiment of the present disclosure provides a system and associated processes for sharing cardholder data (CHD) between a merchant that utilizes tokenization and a second merchant that may or may not utilize tokenization. In one embodiment, the merchant, or an employee of the merchant, can use the system and associated processes to reacquire CHD from a tokenization provider system. In one embodiment, the merchant identifies to the tokenization provider system a desire to share CHD, which is associated with a token, with a second merchant. The merchant and/or the tokenization provider system can then invite the second merchant to register with the tokenization provider system. Once registered with the tokenization provider system, the second merchant can access any CHD that the merchant associated with the second merchant.

2 Claims, 23 Drawing Sheets

Related U.S. Application Data

(60) Provisional application No. 61/476,194, filed on Apr. 15, 2011, provisional application No. 61/621,222, filed on Apr. 6, 2012, provisional application No. 61/714,959, filed on Oct. 17, 2012.

(51) Int. Cl.
  *G06Q 20/08* (2012.01)
  *G06Q 20/24* (2012.01)
  *G06Q 20/40* (2012.01)

(58) Field of Classification Search
  USPC .................................................. 705/64–66
  See application file for complete search history.

(56) References Cited

U.S. PATENT DOCUMENTS

| | | | |
|---|---|---|---|
| 6,327,578 B1 | 12/2001 | Linehan | |
| 6,523,041 B1 | 2/2003 | Morgan et al. | |
| 6,636,833 B1 | 10/2003 | Flitcroft et al. | |
| 7,007,840 B2 | 3/2006 | Davis | |
| 7,039,611 B2 | 5/2006 | Devine | |
| 7,249,099 B2 * | 7/2007 | Ling | 705/41 |
| 7,548,889 B2 | 6/2009 | Bhambri et al. | |
| 7,554,987 B2 | 6/2009 | Proctor et al. | |
| 8,468,090 B2 * | 6/2013 | Lesandro et al. | 705/39 |
| 2002/0133412 A1 | 9/2002 | Oliver et al. | |
| 2002/0152180 A1 | 10/2002 | Turgeon | |
| 2003/0061170 A1 * | 3/2003 | Uzo | 705/64 |
| 2005/0119978 A1 | 6/2005 | Ates | |
| 2006/0282372 A1 | 12/2006 | Endres et al. | |
| 2007/0016943 A1 | 1/2007 | M'Raihi et al. | |
| 2007/0192245 A1 | 8/2007 | Fisher et al. | |
| 2009/0183250 A1 | 7/2009 | Harada | |
| 2009/0198617 A1 | 8/2009 | Soghoian et al. | |
| 2009/0261162 A1 | 10/2009 | Kargman et al. | |
| 2009/0294527 A1 * | 12/2009 | Brabson et al. | 235/380 |
| 2010/0114740 A1 | 5/2010 | Dominguez et al. | |
| 2010/0242096 A1 | 9/2010 | Varadharajan et al. | |
| 2010/0276484 A1 | 11/2010 | Banerjee et al. | |
| 2011/0161233 A1 * | 6/2011 | Tieken | 705/71 |
| 2012/0041881 A1 * | 2/2012 | Basu et al. | 705/67 |
| 2012/0259782 A1 * | 10/2012 | Hammad | G06Q 20/12 705/44 |
| 2012/0265631 A1 | 10/2012 | Cronic et al. | |
| 2013/0080995 A1 * | 3/2013 | Raza | G06F 8/35 717/107 |
| 2013/0086141 A1 | 4/2013 | Saldhana | |
| 2013/0185210 A1 * | 7/2013 | Dodson | H04L 63/08 705/44 |
| 2013/0191289 A1 | 7/2013 | Cronic et al. | |
| 2013/0198080 A1 | 8/2013 | Anderson et al. | |
| 2013/0198851 A1 | 8/2013 | Spies et al. | |
| 2013/0304649 A1 | 11/2013 | Cronic et al. | |

FOREIGN PATENT DOCUMENTS

| | | |
|---|---|---|
| KR | 10-2003-0082187 | 10/2003 |
| WO | WO 01-01280 A2 | 1/2001 |
| WO | WO 2006-004441 | 1/2006 |
| WO | WO 2006-121854 | 11/2006 |
| WO | WO 2008-119985 | 10/2008 |
| WO | WO 2012/142370 | 10/2012 |

OTHER PUBLICATIONS

Scoping SIG, Tokenization Taskforce, PCI Security Standards Council, Information Supplement: PCI DSS Tokenization Guidelines, Aug. 2011, pp. 1-23, Version 2.0.

PCI Security Stands Council, Payment Card Industry (PCI) Data Security Standard (DSS) and Payment Application Data Security Standard (PA-DSS) Glossary of Terms Abbreviations and Acronyms, Oct. 2010, 17 pages, Version 2.0.

International Search Report/Written Opinion, International Application No. PCT/US2012/033457 dated Sep. 27, 2012, 11 pages.

Anonymous: "Tokenization (data security)—Wikipedia, the free encyclopedia", Apr. 3, 2011 (Apr. 3, 2011), XP55240573, Retrieved from the Internet: URL:http://en.wikipedia.org/w/index.php?title=Tokenization_(data_security)&oldid=422061528 [retrieved on Jan. 12, 2016].

Summons to Attend Oral Proceedings Pursuant to Rule 115(1) EPC in corresponding EP Application No. 12772014.2, dated Jan. 26, 2016, 12 pgs.

* cited by examiner

MERCHANT-BASED TOKEN SHARING

RELATED APPLICATIONS

This application claims priority to and is a continuation-in-part of U.S. application Ser. No. 13/303,983, filed on Nov. 23, 2011 and titled "METHOD AND SYSTEM FOR ENABLING MERCHANTS TO SHARE TOKENS," which is a nonprovisional of U.S. Provisional Application No. 61/476,194, filed on Apr. 15, 2011 and titled "METHOD AND SYSTEM FOR SHARING TOKENS," each of which is hereby incorporated by reference in its entirety herein. Further, this application claims priority to U.S. Provisional Application No. 61/621,222, filed on Apr. 6, 2012 and titled "METHOD AND SYSTEM FOR ENABLING MERCHANTS TO SHARE TOKENS," and to U.S. Provisional Application No. 61/714,959, filed on Oct. 17, 2012 and titled "METHOD AND SYSTEM FOR ENABLING MERCHANTS TO SHARE TOKENS," each of which is hereby incorporated by reference in its entirety herein. In addition, this application was filed on Mar. 12, 2013, the same day as U.S. application Ser. No. 13/797,246 titled "METHOD AND SYSTEM FOR UTILIZING AUTHORIZATION FACTOR POOLS," which is hereby incorporated by reference in its entirety herein.

BACKGROUND

Tokenization is a process used in credit, debit, and gift card processing systems to avoid storing cardholder data (CHD) such as credit and debit card numbers, pin numbers, expiration dates, card security codes, and the like at a merchant's location. For example, when a merchant initially accepts a credit card at a point-of-sale (POS) system, the CHD is encrypted and sent to a remote gateway system. The gateway system requests authorization from a credit card processor, which obtains authorization from a bank that issued the card. The gateway system receives the authorization from the credit card processor and provides a token to the merchant for storage along with the authorization.

The token can be a globally unique, randomized, alphanumeric replacement for the CHD. The merchant's POS system stores the token instead of storing the CHD. If the merchant needs to reauthorize a customer (for example, to add a tip at a restaurant), the merchant sends the token to the gateway system, which then sends the actual CHD to the processor. With tokenization, thieves cannot steal CHD from merchants because the tokens are stored in place of the actual CHD.

SUMMARY

Embodiments of the present disclosure relate to a system for sharing cardholder data (CHD). In some embodiments, the system includes a tokenization system. The tokenization system may be configured to receive CHD of a cardholder, or customer, from a first merchant. The tokenization system can associate a token with the CHD in physical computer storage to thereby enable the token to be used to represent the CHD or, in some cases, in place of the CHD. Further, the tokenization system may be configured to electronically transmit the token to the first merchant so as to enable the first merchant to perform a first transaction for the cardholder without having to store the CHD. In some implementations, the system may include a token-access granting system that includes computer hardware. The token-access granting system may be configured to receive an indication from the first merchant that one or more of the token and the CHD are to be shared with a second merchant. In response to receiving the indication, the token-access granting system may be configured to authorize the second merchant to access one or more of the token and the CHD, thereby enabling the second merchant to perform a second transaction for the cardholder.

Additional embodiments of the present disclosure relate to a method for sharing a token associated with cardholder data (CHD) in a tokenization provider system to enable the sharing of cardholder data between users. In certain embodiments, the method may be performed by a token access system implemented in a computing system that includes one or more processors. The method may include generating a first set of words and associating the first set of words with a token. The token may be associated with CHD in a tokenization provider system. The method may further include associating, in computer memory of the token access system, the first set of words with a user. In addition, the method may include providing access to the first set of words to the user. The method may also include receiving user authentication information associated with the user and receiving a second set of words from the user. In some implementations, the method includes determining whether the user is authorized to use the token by at least authenticating the user based, at least in part, on the user authentication information, and determining whether the second set of words matches the first set of words. In response to determining that the user is authorized to use the token, the method may include providing the user with electronic access to the token.

Some embodiments of the present disclosure relate to a system for sharing cardholder data (CHD). This system may include a token acquisition system configured to provide CHD of a cardholder to a tokenization provider system. Further, the token acquisition system may be configured to receive electronically a token associated with the CHD so as to enable a first merchant associated with the token acquisition system to perform a first transaction for the cardholder without having to store the CHD. In some implementations, the system includes a token sharing system configured to provide to the tokenization provider system an indication that one or more of the token and the CHD are to be shared with a second merchant, thereby enabling the second merchant to perform a second transaction for the cardholder.

BRIEF DESCRIPTION OF THE DRAWINGS

Throughout the drawings, reference numbers are re-used to indicate correspondence between referenced elements. The drawings are provided to illustrate embodiments of the inventive subject matter described herein and not to limit the scope thereof.

DETAILED DESCRIPTION OF SPECIFIC EMBODIMENTS

Introduction

Figure 1:
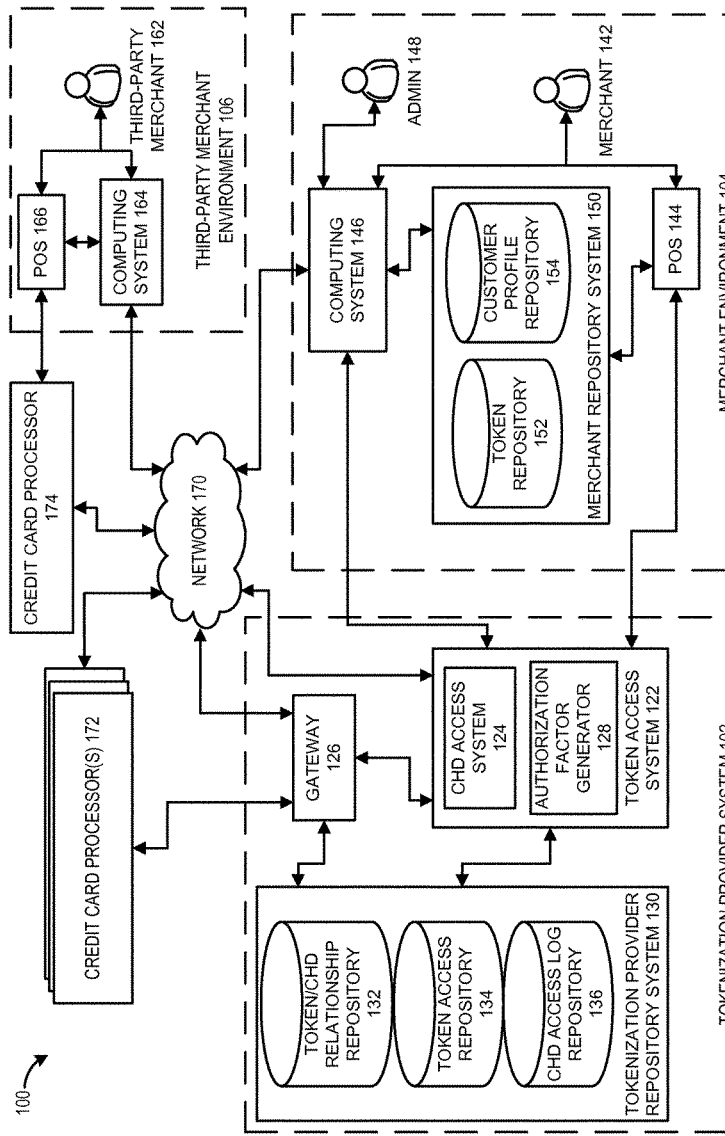
FIG. 1 illustrates an example embodiment of a token-sharing environment.

The security advantages of tokenization sometimes come at the expense of flexibility. Because a merchant that uses tokenization stores a token instead of cardholder data (CHD), the merchant cannot share the CHD with a second merchant. This inability to share CHD can affect the merchant's ability to fully service his or her customers. For example, many quality hotels will make restaurant reservations, order flowers, reserve theatre tickets, and provide a number of additional services for guests that help differentiate these quality hotels from lesser quality hotels. However, without access to CHD, it becomes more difficult if not impossible to provide guests with these aforementioned services.

Further, the lack of access to CHD by merchants that use third-party services, which take advantage of tokenization, can affect the ability of some merchants to charge for cancelled reservations. For example, a golf course may work with a vacation reservation company to sell tee-times to vacationers. If a vacationer fails to show up without properly cancelling his or her reservation, the golf course may wish to charge the vacationer a cancellation fee. However, if the vacation reservation company utilizes a tokenization service, the vacation reservation company will be unable to provide the golf course with the CHD.

Moreover, there are instances where a merchant may desire to reacquire CHD. For example, the merchant may want to process a transaction that includes interacting with a payment or credit card processor that is not supported by the tokenization gateway, which handles transactions on behalf of merchants that opt to use tokenization.

One embodiment of the present disclosure provides a system and associated processes for sharing CHD between a merchant that uses tokenization and a second merchant that may or may not use tokenization. In one embodiment, the merchant, or an employee of the merchant, can use the system and associated processes to reacquire CHD from a tokenization provider system. In one embodiment, the merchant identifies to the tokenization provider system a desire to share CHD, which is associated with a token, with a second merchant. If the second merchant is not registered with the tokenization provider system, the merchant and/or the tokenization provider system can invite the second merchant to register with the tokenization provider system. Once registered with the tokenization provider system, the second merchant can access any CHD that the initial merchant associates with the second merchant.

In one embodiment, the second merchant identifies the token associated with the CHD to the tokenization provider system. If the merchant has given the second merchant access to the token, then the tokenization provider system can provide the second merchant with the CHD. In one embodiment, providing the CHD to the second merchant comprises the tokenization provider system performing a transaction using the CHD for the second merchant. Advantageously, in some embodiments, the tokenization provider performing the transaction for the second merchant maintains the security advantages gained from tokenization because the second merchant can use the CHD without the second merchant viewing the CHD and without a copy of the CHD being sent to the second merchant's location. In one embodiment, once the second merchant acquires the CHD, the second merchant can use the tokenization provider system, or the second merchant's tokenization provider system, to obtain a new token associated with the CHD and the second merchant. The second merchant can then take advantage of tokenization and avoid storing the CHD at the second merchant's location.

In one embodiment, providing the second merchant with access to the token and/or the CHD associated with the token comprises providing the second merchant with an authorization factor. This authorization factor is associated with one or more of the token, the CHD, and the second merchant. In one embodiment, to access the token and/or CHD, the tokenization provider system can request that the second merchant present the authorization factor as part of the user authentication process. Advantageously, in some embodiments, use of the authorization factor prevents automated systems from accessing the token and/or CHD. Further, in some embodiments, use of the authorization factor increases the security of the CHD because, in certain embodiments, the CHD is protected by two levels of obscurity. A user attempting to access the CHD may be required to authenticate with the tokenization provider system and provide the authorization factor. Further, the authorization factor can be associated with the CHD and the user thereby preventing a user who is authorized to access the tokenization provider system, but not the CHD from accessing the CHD.

Many variations of these example systems and associated processes are described below in more detail with reference to the drawings. Further, in some cases, one or more of the various embodiments and systems can be combined into fewer embodiments or systems or split into multiple embodiments or systems.

Example Token-Sharing Environment

FIG. 1 illustrates an example embodiment of a token-sharing environment 100. The token-sharing environment 100 can comprise a tokenization provider system 102, a merchant environment 104, and a third-party merchant environment 106.

The tokenization provider system 102 is associated with a tokenization provider (not shown) and can generally include any system capable of creating a token associated with CHD, storing the token and the CHD, and providing the token to a user (e.g. a merchant 142) of the tokenization provider system 102. Further, the tokenization provider system 102 can generally include any system capable of performing a payment card transaction on behalf of the merchant 142 without the merchant 142 having or maintaining a copy of the CHD. This CHD can include any information associated with a customer of the merchant environment 104 and the customer's payment card that is necessary to process a payment transaction, but which the merchant 142 does not wish to store at the merchant environment 104 due to, for example, security-related expenses or concerns. Further, the payment card can be any type of card that can facilitate completing the payment transaction. For example, the payment card can be a credit card, debit card, or gift card. One example of such a tokenization provider system is the Dollars On The Net® solution from Shift4® Corporation of Las Vegas, Nev.

The merchant environment 104 can generally include any product or service provider that accepts credit cards, or other types of payment cards, for payment and utilizes the tokenization provider system 102 for payment processing. For example, the merchant environment 104 can be a hotel, an electronics store, a restaurant, an online ecommerce website, or a healthcare provider, to name a few. Further, the merchant environment 104 may be associated with an organization, or merchant organization, that is affiliated with or owns one or more merchant environments. For example, assuming the merchant environment represents a hotel, the organization may be associated with a number of hotel locations and/or hotel chains.

Generally, the merchant organization is a different organization than the tokenization provider. However, in some embodiments, the merchant organization may be the same organization as the tokenization provider that is associated with the tokenization provider system 102. For example, the tokenization provider system 102 may represent, at least in part, the corporate headquarters for the merchant organization or it may represent a central processing facility for processing payment transactions for one or more locations of the merchant environment 104. Further, the merchant environment 104 may represent a store location owned by the merchant organization, or the merchant environment 104 may represent a franchisee.

In one embodiment, the merchant environment 104 includes a merchant 142 and an administrator 148. The merchant 142 can represent any individual (e.g. an employee) affiliated with the merchant environment 104 who may or may not have administrative access to an account associated with the tokenization provider system 102. The admin 148 can represent any individual affiliated with the merchant environment 104 who has administrative access to an account associated with the tokenization provider system 102. For example, the admin 148 can be a manager or an owner of the merchant environment 104.

The third-party merchant environment 106 can generally include any product or service provider that accepts credit cards, or other types of payment cards, for payment and may or may not utilize the tokenization provider system 102 for payment processing. For example, the third-party merchant environment 106 can be a flower shop, a hotel, a theatre, another ecommerce website, or a franchisee of the merchant environment 104. In one embodiment, the third-party merchant environment 106 may utilize a tokenization provider system that is not affiliated with the tokenization provider system 102. In one embodiment, the third-party merchant environment 106 includes a third-party merchant 162. The third-party merchant 162 can represent any individual associated with the third-party merchant environment 106.

In one embodiment, the merchant 142 can obtain CHD from a cardholder, or customer, (not shown) during a first or initial transaction. When the merchant 142 provides the CHD to the POS 144, the POS 144 can provide the CHD to a token access system 122, which is associated with the tokenization provider system 102. In turn, the token access system 122 can provide the POS 144 with a token associated with the CHD. This token can be generated by the token access system 122 or a token generation system (not shown) that is associated with the tokenization provider system 102. The POS 144 can then delete any CHD and can store the token at the token repository 152, which is part of the merchant repository system 150. Further, the POS 144 can associate the token with a cardholder, or customer, profile associated with the cardholder, or customer, and stored at the customer profile repository 154, which is part of the merchant repository system 150. The token access system 122 can store the CHD and the token, as well as the relationship between the token and the CHD, at the token/CHD relationship repository 132, which is part of the tokenization provider repository system 130.

The POS 144 can generally represent any point-of-sale system that can process payment card transactions by communicating with the credit card processors 172, or by communicating with the tokenization provider system 102, which communicates with the credit card processors 172 for the POS 144. The tokenization provider system 102 may communicate with the credit card processors 172 using, for example, the gateway 126. In one embodiment, the POS 144 communicates directly with the tokenization provider system 102 via a private secure connection. Alternatively, the POS 144 can communicate with the tokenization provider system 102 via the network 170. The network 170 can include any type of wired or wireless network. For example, the network 170 can be a LAN, WAN, or the Internet, to name a few. The credit card processors 172 and the credit card processor 174 can generally include any payment card processing system or service.

The token access system 122 can generally include any system that can generate tokens associated with CHD and provide the tokens to a merchant environment 104. Further, the token access system 122 can include any system that can regulate access to the tokens, and CHD associated with the tokens.

The merchant repository system 150 can generally include any repository, database, or information storage system that can store information associated with the merchant environment 104. In one embodiment, the merchant repository system 150 comprises the token repository 152 and the customer profile repository 154. The token repository 152 can generally include any system capable of storing tokens associated with CHD. In one embodiment, the token repository 152 stores token identifiers associated with tokens stored at the tokenization provider system 102. In some cases, the token repository 152 stores hashed and/or encrypted versions of the token instead of, or in addition to, the token. The customer profile repository 154 can generally include any information associated with customers of the merchant environment 104 that the merchant environment 104 may store. For example, the customer profile repository 154 may include the cardholder's or customer's identity, the customer's preferences (e.g. red flowers or a corner hotel room), and the customer's purchase history, to name a few. In one embodiment, one or more of the token repository 152 and the customer profile repository 154 may store information linking an entry in the customer profile repository 154 with an entry in the token repository 152 thereby associating a token with a customer. In one embodiment, the token repository 152 and the customer profile repository 154 can be combined or divided further.

The tokenization provider repository system 130 can generally include any repository, database, or information storage system that can store information associated with the tokenization provider system 102. In one embodiment, the tokenization provider repository system 130 comprises a token/CHD relationship repository 132, a token access repository 134, and a CHD access log repository 136. The token/CHD relationship repository 132 can generally include any system that can store CHD and tokens, as well as the relationship between the tokens and the CHD. The tokens and CHD may each be stored in a hashed and/or encrypted form. The token access repository 134 can generally include any system that can store information associated with identifying who can access the tokens and CHD maintained by the tokenization provider system 102. This information can include user identification information, user authentication information, and user/token relationship information, to name a few. The CHD access log repository 136 can generally include any system that can store information associated with token and CHD access by users of the tokenization provider system 102. These users can include both users who use the tokenization provider system 102 for tokenization services (e.g. the merchant 142) and users who access the tokenization provider system 102 to access shared tokens or CHD (e.g. the third-party merchant 162). In one embodiment, the token/CHD relationship repository 132, the token access repository 134, and the CHD access log repository 136 can be combined or divided further.

In one embodiment, the merchant 142 can provide the third-party merchant 162 with access to the CHD. Providing the third-party merchant 162 with access to the CHD comprises the merchant 142 providing the third-party merchant 162 with access to the token associated with the CHD. To provide the third-party merchant 162 with access to the CHD, the merchant 142 can send the token or token identifier and a merchant identifier associated with the third-party merchant 162 to the token access system 122. Further, the token access system 122 provides the token or a token-identifier to the third-party merchant 162 enabling the third-party merchant 162 to access the CHD associated with the token at the tokenization provider system 102.

In one embodiment, the merchant 142 provides the token or the token-identifier to the third-party merchant 162 using, for example, the computing system 146 thereby enabling the third-party merchant 162 to access CHD associated with the token at the tokenization provider system 102.

In one embodiment, access to the CHD is generally on a limited basis. For example, using the token, the third-party merchant 162 may only be able to access the CHD once, a small number of times, or for a predefined period (such as 15-minutes). However, access to the CHD is not so limited in other embodiments.

In one embodiment, the merchant 142 can remove access to the CHD from the third-party merchant 162 by requesting that the token access system 122 disassociate the token from the third-party merchant 162.

In some embodiments, the merchant 142 provides token access to one or more users that have been pre-identified to the tokenization provider system 102 by the admin 148 using, for example, the computing system 146. Similarly, in some embodiments, the admin 148 can remove access to the CHD from the one or more pre-identified users. In one embodiment, the pre-identified users can be third-parties (e.g. the third-party merchant 162) and/or users associated with the merchant environment 104 (e.g. the merchant 142).

In some embodiments, although the third-party merchant 162 may or may not be a customer of the tokenization provider, to access the CHD, the third-party merchant 162 registers with the token access system 122. Registration with the token access system 122 enables the token-access system 122 to associate the token with the third-party merchant 162. Further, the registration enables the tokenization provider to optionally verify the identity of the third-party merchant 162 and to determine if the third-party merchant 162 is trustworthy based on publicly available information or any other information source available to the tokenization provider.

In one embodiment, the third-party merchant 162 accesses the token access system 122 via a computing system 164 or a POS 166. The third-party merchant 162 authenticates with the token access system 122 and can then request the CHD associated with a token by providing a copy of the token or a token identifier associated with the token to a CHD access system 124. If the third-party merchant 162 has been pre-authorized by the admin 148 to access the CHD, the CHD access system 124 can provide the third-party merchant 162 with access to the CHD. Once the third-party merchant 162 has gained access to the CHD, the third-party merchant 162 can process a transaction for the customer via the POS 166 using the CHD. Alternatively, if the third-party merchant 162 is a customer of the tokenization provider, the third-party merchant 162 can use the gateway 126 to process the transaction. In one embodiment, gaining access to the CHD enables the third-party merchant 162 to view the CHD. Alternatively, in some embodiments, gaining access to the CHD enables the third-party merchant 162 to perform a transaction with or without viewing the CHD.

In one embodiment, the CHD access system 124 causes the CHD to be displayed to the user via one or more of the POS 166 and the computing system 164.

The CHD access system 124 can generally include any system that can provide access to CHD associated with a token. In one embodiment, the CHD access system 124 authenticates a user and determines whether the user is authorized to access the CHD before providing access to CHD associated with a token.

The token access system 122, or the CHD access system 124, can log each access of the CHD or token at the CHD access log repository 136, which is part of the tokenization provider repository system 130. Advantageously, in some embodiments, by logging each access of the CHD or token, it can be determined if a potential unauthorized use of the CHD is attributable to the merchant 142, the third-party merchant 162, or some unrelated party.

The POS 166 can generally represent any point-of-sale system that can process payment card transactions by communicating with the credit card processor 174. In one embodiment, the POS 166 communicates directly with the credit card processor 174. Alternatively, the POS 166 communicates with the credit card processor 174 via the network 170. The POS 166 may also communicate with the credit card processor 174 or the credit card processors 172 using the tokenization provider system 102. Generally, this communication may occur if the third-party merchant environment 106 is also a customer of the tokenization provider system 102. However, in some instances, the POS 166 may use the tokenization provider system 102 to communicate with the credit card processors without the third-party merchant environment 106 being a customer of the tokenization provider system 102. For example, in some cases the third-party merchant 106 may be authorized to use the tokenization provider system 102 when initiating transactions that use CHD associated with a token provided by a party that is a customer of the tokenization provider system 102, such as the merchant environment 104. In one embodiment, the POS 166 and the POS 144 can be similarly configured.

The gateway 126 can generally include any system that can process transactions by providing CHD and transaction information to the credit card processors 172 either directly or via the network 170 on behalf of the merchant environment 104.

The computing systems 146 and 164 can generally include any computing device(s), such as desktops, laptops, and wireless mobile devices (e.g. smart phones, PDAs, tablets, or the like), to name a few. In one embodiment, one or more of the merchant environment 104 and the third-party merchant environment 106 is associated with an ecommerce website. In one embodiment, the computing systems 146 and 164 can also include video game platforms, television set-top boxes, televisions (e.g., internet TVs), and computerized appliances, to name a few. In one embodiment, the computing systems 146 and 164 can include any computing device that can interact with the tokenization provider system 102.

In one embodiment, providing access to a token and the CHD associated with the token comprises associating an authorization factor with the token. For example, to provide the third-party merchant 162 with access to the CHD, the merchant 142 can send the token and a merchant identifier associated with the third-party merchant 162 to the token access system 122. The token access system 122 can use the authorization factor generator 128 to generate an authorization factor. The authorization factor can be associated with the token and the merchant identifier at the token access repository 134. The token access system 122 can provide the authorization factor along with the token or token-identifier to the third-party merchant 162 enabling the third-party merchant 162 to access the CHD associated with the token at the tokenization provider system 102. In one embodiment, the merchant 142 provides the authorization factor to the third-party merchant 162.

The authorization factor generator 128 can generally include any system capable of generating or otherwise accessing an authorization factor. The authorization factor can include any factor that can be used to help authenticate the third-party merchant 162 and to prevent automated systems, possibly associated with malicious users, from attempting to obtain CHD access. For example, the authorization factor can comprise a set of one or more random or pseudo-random words, numbers, symbols, images, sounds, or a combination of the same. In some embodiments, the authorization factor can be non-random and may be associated with a defined algorithm. Further, in some embodiments, the authorization factor can be associated with a theme. For example, the authorization factor can be a set of four random color words, car images, or rock music sound bites. In some embodiments, the authorization factor can be a security question. In some cases, the authorization factor can be in one or more languages. Further, in some cases, the words may be sets of random characters that may or may not spell a word as understood by, for example, the merchant 162.

In one embodiment, to access CHD associated with a token, the third-party merchant 162 authenticates with the tokenization provider system 102. The third-party merchant 162 also provides both a token or token identifier and an authorization factor. If the authorization factor matches an authorization factor associated with the token and the token is associated with the third-party merchant 162, then the CHD access system 124 can provide the third-party merchant 162 with access to the CHD associated with the token. Thus, in some embodiments, the third-party merchant 162 must be registered with the tokenization provider system 102, and have been granted access to the CHD by the merchant 142.

In one embodiment, the admin 148 identifies the merchants, or users, to the tokenization provider system 102 that the merchant 142 can potentially provide token access. In one embodiment, the admin 148 identifies to the tokenization provider system 102 the employees of the merchant environment 104 that can share token access with other merchants, or users.

In one embodiment, the authorization factor is presented to the third-party merchant 162 via a human-detection test, such as a captcha, reverse Turing test, or other challenge-response test. In one embodiment, the authorization factor is presented to the third-party merchant via a RSA hardware authenticator. In one embodiment, after providing the authorization factor, a phone-verification system (not shown) associated with the tokenization provider system 102 can contact the third-party merchant 162 to request verification that the third-party merchant 162 is attempting to access the CHD associated with a token. In some embodiments, use of the phone-verification system can advantageously prevent attempts at automated CHD access by malicious programs.

In one embodiment, one or more of the token access system 122, the CHD access system 124, and the authorization factor generator 128 can be located at the merchant environment 104.

As one example, non-limiting, use-case of an embodiment of the present disclosure, assume that the merchant environment 104 represents an electronics store and the third-party merchant environment 106 represents an extended warranty provider. The extended warranty provider is contracted with the merchant environment 104 to provide extended warranties to customers of the merchant environment 104 who opt to purchase an extended warranty with their electronic purchase. A customer who is attempting to purchase a television may provide CHD to the merchant environment 104. The merchant environment 104 may then provide the CHD to the tokenization provider system 102. The tokenization provider system 102 processes the transaction and returns a token associated with the CHD to the merchant environment 104 which stores the token and associates the token with the customer. Now, assume the customer decides to purchase the extended warranty for the television. The merchant environment 104 can authorize the third-party merchant environment 106 to use the token. The third-party merchant environment 106 can then access the tokenization provider system 102 and request the CHD associated with the token, thereby enabling the third-party merchant 106 to process the extended warranty transaction for the customer. Alternatively, the third-party merchant environment 106 can request that the tokenization provider system 102 process the extended warranty transaction using the CHD associated with the token.

Example Token Provisioning Process

Figure 2:
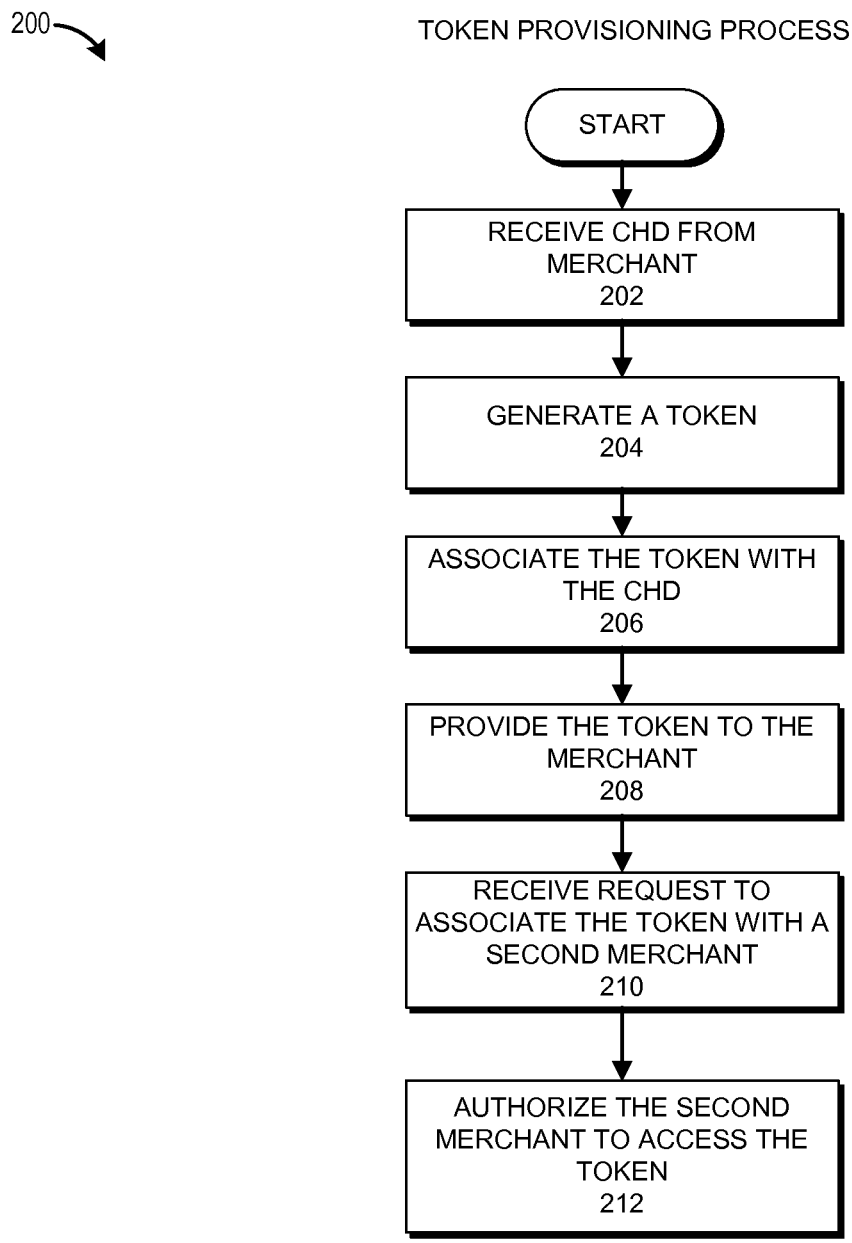
FIG. 2 illustrates a flow diagram for an example embodiment of a token provisioning process.

FIG. 2 illustrates a flow diagram for an example embodiment of a token provisioning process 200. The process 200 can be implemented by any system that can generate and associate a token with CHD on behalf of a merchant 142 and can provide a second merchant, such as the third-party merchant 162, with access to the token. For example, the process 200, in whole or in part, can be implemented by one or more of the token access system 122, the CHD access system 124, and the gateway 126. In one embodiment, the second merchant can be a merchant that is associated with the merchant 142, such as an employee of the merchant 142. Although any number of systems, in whole or in part, can implement the process 200, to simplify discussion, the process 200 will be described as being generally implemented by the token access system 122.

The process 200 begins at block 202, where, for example, the token access system 122 receives CHD from the merchant 142. At block 204, the token access system 122 generates a token. This token can be any piece of random or pseudo-random globally unique data that can be stored by the merchant 142 in place of the CHD. In one embodiment, the token can include alphanumeric characters, symbols, pictures, sounds, video, etc. For example, the token may include a set of four words that may be English words, words in any other language, or words from multiple languages. A user can provide the token to a system, such as the token access system 122, using a user interface configured according to the type of token. For example, if the token includes a set of words, the user interface may include a set of text fields. As a second example, if the token includes sounds, the interface may receive input from a musical keyboard or may map different keys on a computer keyboard to different sounds. Advantageously, in some embodiments, the keys that map to the sounds may differ each time the user attempts to provide the token using the user interface thereby reducing the possibility that a user can learn a set of letters in place of the sound-based token.

In some cases, the token can be based on a theme. Advantageously, in some embodiments, using easily remembered tokens, such as English words associated with a theme (e.g., animals, colors, etc.) facilitates a user remembering the token. As described in more detail below, such as with respect to the process 300 of FIG. 3, accessing the CHD using the token may require authentication of a user as well as determining the user's authorization to use the token. Thus, in some embodiments, using a token that is designed to be relatively easy to remember does not reduce the security benefits of tokenization. In some cases, the token may include multiple types of data, e.g., the token could be any combination of words, images, sounds, or video. For example, the token may include a word, a set of random characters, and five musical notes. Generally, there exists no correlation between the token value or contents and the contents of the CHD thereby making it impossible to determine the CHD from the token itself. However, in some embodiments, one or more pieces of the CHD can be used to facilitate generating the token. In one embodiment, the token differs from an encrypted version of the CHD and thus, cannot be manipulated to obtain the CHD. In one embodiment, the token can be an encrypted form of the CHD or a combination of encrypted CHD and false non-CHD.

In some cases, the token may be formatted in a card-swipe compatible format. Further, in some cases, the token may be formatted to be processed by one or more systems (e.g., Point of Sale systems) as if the token were CHD. Moreover, the token may be configured to replace CHD or a Primary Account Number (PAN) included with the CHD with a surrogate value. Typically, this surrogate value is unique and is generated to not include a valid PAN or CHD.

In some embodiments, a single token exists at any given time per CHD. However, at different points in time, a different token may be associated with a particular CHD. In some embodiments, the token is, at least in part, algorithmically generated.

At block 206, the token access system 122 associates the token with the CHD. In some embodiments, the relationship between the token and the CHD is stored at the token/CHD relationship repository 132. In some embodiments, the token access system 122 may also associate the token with the merchant 142. This relationship may also optionally be stored at the token/CHD relationship repository 132. In some cases, there may exist a number of tokens and sets of CHD data. For example, there may be one, a hundred, a thousand, ten-thousand, a million, or more tokens and sets of CHD data. Thus, the token access system 122, for example, may maintain relationships between a number of tokens and sets of CHD data, including, one, a hundred, a thousand, ten-thousand, etc. Generally, one token is associated with one set of CHD data. However, in some embodiments, a token may be associated with multiple sets of CHD data and/or a set of CHD data may be associated with multiple tokens. For example, multiple merchants may have obtained a set of CHD from a customer, and as a result, if more than one of the merchants uses tokenization, it is possible for multiple tokens to be associated with one set of CHD.

At block 208, the token access system 122 provides the token to the merchant 142. In one embodiment, providing the token to the merchant 142 enables the merchant to perform transactions without the CHD. The merchant 142 can identify the token and provide transaction details, for example, to the gateway 126 or the token access system 122. The gateway 126 can then process the transaction on behalf of the merchant 142. In some embodiments, the merchant 142 can store the token at the token repository 152. Advantageously, in some embodiments, once the CHD has initially been provided to the token access system 122, the merchant 142 can perform a transaction using the CHD without directly accessing, viewing, or maintaining a copy of the CHD at the merchant environment 104.

At block 210, the token access system 122 receives a request to associate the token with a second merchant, such as the third-party merchant 162. In some embodiments, the request comprises receiving one or more of an identifier, contact information, and account information associated with the third-party merchant 162. Generally, this information does not include information that the third-party merchant 162 uses to access the tokenization provider system 102. For example, the identifier or account information may include a public identifier that the third-party merchant 162 can share with merchants who wish to grant the third-party merchant 162 with token access, but generally the public identifier is distinct from an identifier the third-party merchant 162 uses to identify itself to the tokenization provider system 162. However, in some embodiments, the public identifier and the login identifier may be the same. Further, in some embodiments, the request comprises receiving the identity of the token. Alternatively, the request comprises receiving a copy of the token.

The token access system 122 authorizes the second merchant (e.g. the third-party merchant 162) to access the token at block 212. In some embodiments, authorizing access to the token comprises authorizing access to the CHD. In some embodiments, block 212 can also comprise informing the second merchant that the second merchant, or an account associated with the second merchant, is authorized to access the token and/or CHD. In some embodiments, informing the second merchant of the authorization can comprise emailing, texting, leaving a voice message, or providing an alert via the POS 166, the computing system 164, or an account page associated with the third-party merchant 162 at the tokenization provider system 102. In some embodiments, authorizing the second merchant to access the token comprises providing a copy of the token and/or an identifier associated with the token to the second merchant. In some embodiments, the token access system 122 stores the relationship between the second merchant and the token and/or CHD at the token access repository 134.

Example Process for Accessing Cardholder Data

Figure 3:
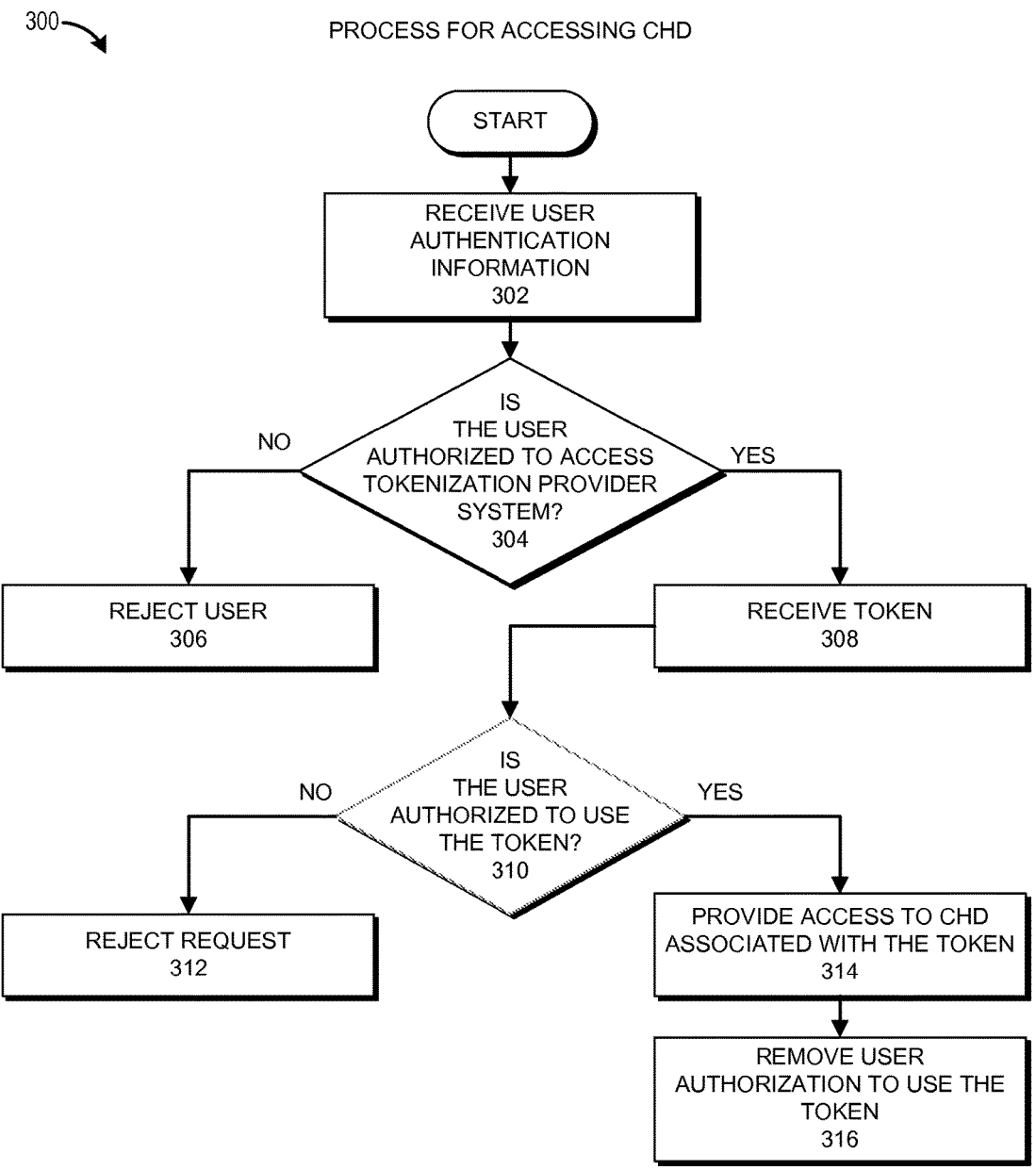
FIG. 3 illustrates a flow diagram for an example embodiment of a process for accessing cardholder data.

FIG. 3 illustrates a flow diagram for an example embodiment of a process 300 for accessing cardholder data. The process 300 can be implemented by any system that can provide a second merchant, such as the third-party merchant 162, with CHD associated with a token, which was created in response to a first merchant, such as the merchant 142, providing the CHD to the system or a related system. For example, the process 300, in whole or in part, can be implemented by one or more of the token access system 122, the CHD access system 124, and the gateway 126. In one embodiment, the second merchant can be a merchant that is associated with the merchant 142, such as an employee of the merchant 142. In one embodiment, the process 300 can be used by the merchant 142, who initially provided the CHD, or an employee of the merchant 142, to retrieve the CHD. Although any number of systems, in whole or in part, can implement the process 300, to simplify discussion, the process 300 will be described as being generally implemented by the CHD access system 124.

The process 300 begins at block 302, where, for example, the CHD access system 124 receives user authentication information associated with, for example, the third-party merchant 162. This user authentication information can generally include any information that can be used to authenticate the third-party merchant 162. For example, the user authentication information can include: a user name, a password, a RSA token code (e.g. a code produced by an RSA SecurID™ hardware authenticator), and the response to a challenge-response test, such as a human-detection test response (e.g. a captcha response) or an answer to a security question.

At decision block 304, the CHD access system 124 determines, based at least in part on the user authentication information, if the third-party merchant 162 is authorized to access the tokenization provider system 102, or any system associated with the tokenization provider system 102. If the third-party merchant 162 is not authorized to use the tokenization provider system 102, the CHD access system rejects the third-party merchant 162 at block 306. In one embodiment, rejecting the third-party merchant 162 can comprise initiating a registration process that enables the third-party merchant 162 to register with the tokenization provider system 102. In one embodiment, rejecting the third-party merchant 162 can comprise providing an error message to the third-party merchant 162.

If the third-party merchant 162 is authorized to access the tokenization provider system 102, the CHD access system 124 receives a token from the third-party merchant 162 at block 308. Alternatively, at block 308, the CHD access system 124 accesses the token pre-associated with the third-party merchant 162 by the merchant 142 from the token access repository 134. In one embodiment, receiving the token comprises receiving a token identifier associated with the token. In one embodiment, receiving the token includes receiving a request to access CHD associated with the token.

At decision block 310, the CHD access system 124 determines if the third-party merchant 162 is authorized to use the token. In one embodiment, to determine if the third-party merchant 162 is authorized to use the token, the CHD access system 124 determines if the third-party merchant 162 is associated with the token at the token access repository 134.

If the third-party merchant 162 is not authorized to use the token, the CHD access system 124 rejects the third-party merchant's 162 request to access the CHD associated with the token at block 312. In one embodiment, rejecting the third-party merchant's 162 request can include logging the third-party merchant's 162 request at the CHD access log repository 136. Further, in one embodiment, rejecting the third-party merchant's 162 request can include informing the merchant 142 of the third-party merchant's 162 attempt to use the token and/or access the CHD associated with the token. In one embodiment, in response to the third-party merchant's 162 failed attempt to access the CHD, the tokenization provider system 102 can replace the token at the tokenization provider system 102 and the merchant environment 104 with a new token.

If the third-party merchant 162 is authorized to use the token, the CHD access system 124 provides access to CHD associated with the token at block 314. In one embodiment, providing access to the CHD comprises providing the CHD to one or more of the POS 166 and the computing system 164. In one embodiment, if given access to the CHD, the third-party merchant 162 can view the CHD. Alternatively, the third-party merchant 162 can initiate a transaction using the CHD at the POS 166, but without viewing the CHD. In one embodiment, providing access to the CHD comprises the gateway 126 performing a transaction using the CHD on behalf of the third-party merchant 162. In one embodiment, providing the third-party merchant 162 with access to the CHD can include logging the third-party merchant's 162 access of the CHD at the CHD access log repository 136.

At block 316, the CHD access system 124 removes the third-party merchant's 162 authorization to use the token, and consequently, the third-party merchant's 162 authorization to access the CHD at the tokenization provider system 102. In one embodiment, removing the third-party merchant's 162 authorization to use the token can comprise disassociating the token and the third-party merchant 162 at the token access repository 134. In one embodiment, the threshold for removing the third-party merchant's 162 authorization to use the token can be based on any predetermined event. For example, authorization can be removed after the third-party merchant 162 uses the token or accesses the CHD a pre-determined number of times, such as once or five-times. As a second example, authorization can be removed after a pre-defined time period, such as 15-minutes from the time merchant 142 authorizes the third-party merchant 162 to use the token, or 10-minutes from the time that the third-party merchant 162 access the CHD using the token. In one embodiment, block 316 is optional.

Second Example of a Token Provisioning Process

Figure 4:
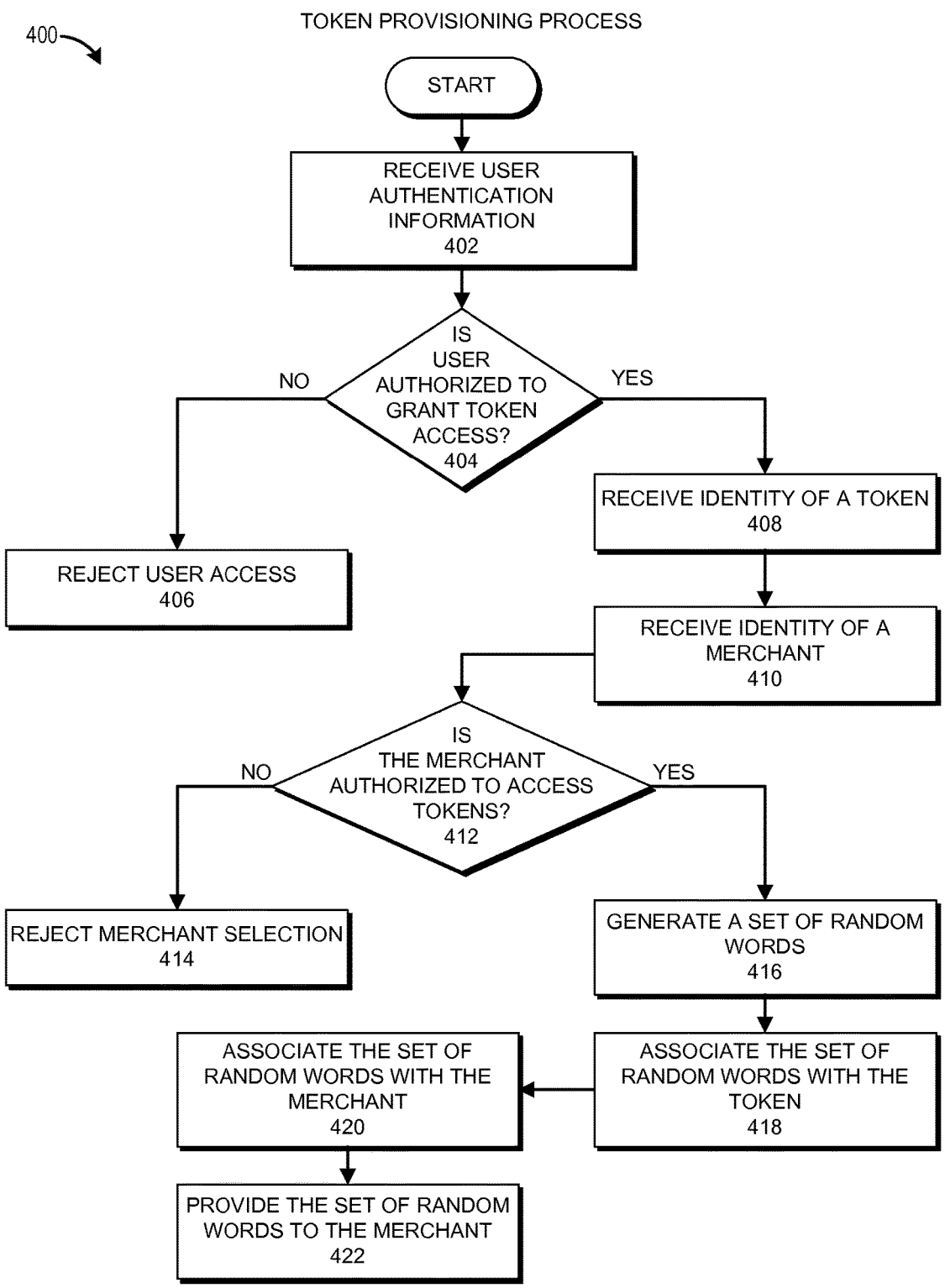
FIG. 4 illustrates a flow diagram for a second example embodiment of a token provisioning process.

FIG. 4 illustrates a flow diagram for a second example embodiment of a token provisioning process 400. The process 400 can be implemented by any system that can generate and associate a token with CHD on behalf of a merchant 142 and can provide a second merchant, such as the third-party merchant 162, with access to the token. For example, the process 400, in whole or in part, can be implemented by one or more of the token access system 122, the CHD access system 124, and the gateway 126. In one embodiment, the second merchant can be a merchant that is associated with the merchant 142, such as an employee of the merchant 142. Although any number of systems, in whole or in part, can implement the process 400, to simplify discussion, the process 400 will be described as being generally implemented by the token access system 122. In some embodiments, the process 400 can be used to provide either a third-party merchant (e.g. the third-party merchant 162), or an employee of the merchant 142 or the merchant environment 104 (e.g. the merchant 142) with access to a token or CHD associated with the token. To simplify discussion, the process 400 will be described as being used to provide the third-party merchant 162 with access to the token or CHD associated with the token.

The process 400 begins at block 402, where, for example, the token access system 122 receives user authentication information associated with the merchant 142. This user authentication information can comprise any information necessary for the token access system 122 to authenticate the merchant 142. For example, the user authentication information can comprise a user name, a password, and a RSA token code, to name a few.

At decision block 404, the token access system 122 determines if the merchant 142 is authorized to grant a second merchant access to a token. In one embodiment, granting the second merchant access to the token can include granting the second merchant the ability to use the token to process a transaction. In one embodiment, decision block 404 comprises determining if the merchant 142 is authorized to access one or more of the tokenization provider system 102, the token access system 122 and the gateway 126. In one embodiment, the merchant 142 may have access to the tokenization provider system 102 without having permission to access all of the systems associated with the tokenization provider system 102. For example, the merchant 142 may have access to the gateway 126 enabling the merchant 142 to process transactions for a customer, but may not have access to the token access system 122 thereby preventing the merchant 142 from providing token access to a second merchant. In one embodiment, the admin 148 determines the merchant's 142 level of access to the tokenization provider system 102. The admin 148 can configure an account associated with the merchant 142 and the tokenization provider system 102 to restrict the merchant's 142 level of access to one or more of systems, tokens, and CHD associated with the tokenization provider system 102.

If the merchant 142 is not authorized to grant a second merchant access to a token, the token access system 122 rejects the merchant 142 from further accessing the token access system 122 at block 406. If the merchant 142 is authorized to grant token access to a second merchant, the token access system 122 receives the identity of a token from the merchant 142 at block 408. Receiving the identity of the token can comprise receiving a token or receiving a token identifier associated with the token. Further, receiving the identity of the token may include receiving a customer record that is associated with a token. Advantageously, in some embodiments, by providing a customer record (or portion thereof, such as a customer record identifier) that is associated with a token to the token access system 122, the merchant 142 can grant token access without knowing the token value, knowing that a token exists, or having any understanding of how tokenization works.

In one embodiment, the token access system 122 verifies that the merchant 142 provided a token associated with the merchant 142 or the merchant environment 104. If the token is not associated with the merchant 142 or the merchant environment 104, the token access system can reject the token. In one embodiment, the token access system 122 can also lock the merchant 142 out of the tokenization provider system 102, log the merchant's 142 actions at the CHD access log repository 130, report the access attempt to the admin 148, or combinations of the same.

At block 410, the token access system 122 receives the identity of the third-party merchant 162, the user whom the merchant 142 wishes to grant token access. In some embodiments, the token access system 122 receives the identity of the third-party merchant environment 106 or an organization associated with the third-party merchant environment 106. In one embodiment, receiving the identity of the third-party merchant 162 comprises receiving the identity of a merchant account associated with the tokenization provider system 102 and the third-party merchant 162. As previously described, the identity can include any information that identifies the third-party merchant 162, or third-party merchant environment 106, to the tokenization provider system 102. This can include, for example, a unique identifier selected by the tokenization provider system 102 or the third-party merchant 162. As additional examples, the identifying information may include an e-mail address, a phone number, or any other contact information. Advantageously, in some embodiments, providing contact information as an identifier enables the merchant 142 to identify a third-party merchant 162 that has not yet registered with the tokenization provider system 102 or without knowing the third-party merchant's 162 unique identifier.

The token access system 122 may also receive a time-based or event-based set of conditions associated with the third-party merchant 162 that limits the third-party merchant's 162 access to the CHD. For example, the conditions may limit the time-period in which the third-party merchant 162 can access the CHD or the number of times the third-party merchant 162 can access the CHD using the token. Further, in embodiments where the tokenization provider system 102 provides CHD access by performing transactions on behalf of the third-party merchant 162, the conditions can include a monetary limit. Advantageously, in some embodiments, setting a monetary limit can prevent a third-party merchant 162 from quoting one price to a customer or merchant 142 while charging a higher price once access to the CHD is obtained. The admin 148 may also pre-define the set of conditions such that each time the merchant 142 provides a third-party merchant with CHD access, the set of conditions are automatically associated with the CHD access.

At decision block 412, the token access system 122 determines if the third-party merchant 162 is authorized to access tokens. This determination can comprise determining if the third-party merchant 162 is registered with the tokenization provider system 102 and/or if the third-party merchant 162 is authorized to access tokens associated with the merchant environment 104. If the third-party merchant 162 is not authorized to access tokens, the token access system 122 rejects the merchant selection of the third-party merchant 162 at block 414. In some embodiments, rejecting the merchant selection can comprise sending a registration request to or initiating a registration process with the third-party merchant 162. In some embodiments, rejecting the merchant selection can comprise requesting that the admin 148 authorize the third-party merchant 162 to access tokens associated with the merchant environment 104, if so desired.

If the third-party merchant 162 is authorized to access tokens, the token access system 122 generates a set of random words at block 416 using, for example, the authorization factor generator 128. Alternatively, the token access system 122 can generate any other type of authentication factor using, for example, the authorization factor generator 128, as described above with respect to FIG. 1. At block 418, the set of random words are associated with the token identified at block 408. At block 420, the set of random words are associated with the third-party merchant 162. In one embodiment, the set of random words are associated with a merchant account associated with the third-party merchant environment 106. An employee associated with the third-party merchant environment 106 that has access to the merchant account can then use the set of random words and obtain access to the token and associated CHD as described with respect to FIG. 5.

At block 422, the set of random words are provided to the third-party merchant 162. In one embodiment, the set of random words can be provided by any type of communication. For example, the token access system 122 can provide the set or random words by email, text, or voicemail, to name a few. In one embodiment, the set of random words are provided to the merchant 142. The merchant 142 can then provide the set of random words to the third-party merchant 162. In one embodiment, performing block 422 can further comprise performing block 212 as described with respect to FIG. 2.

In one embodiment, the set of random words are provided in an encrypted format to the third-party merchant 162. The third-party merchant 162 can then decrypt the encrypted set of random words. In one embodiment, the set of random words can be provided in clear text. However, in some embodiments, because the set of random words are associated with the third-party merchant 162, or the merchant account, at the tokenization provider system 102, malicious users are prevented from using the set of random words to access the token and/or CHD associated with the token.

Second Example Process for Accessing Cardholder Data

Figure 5:
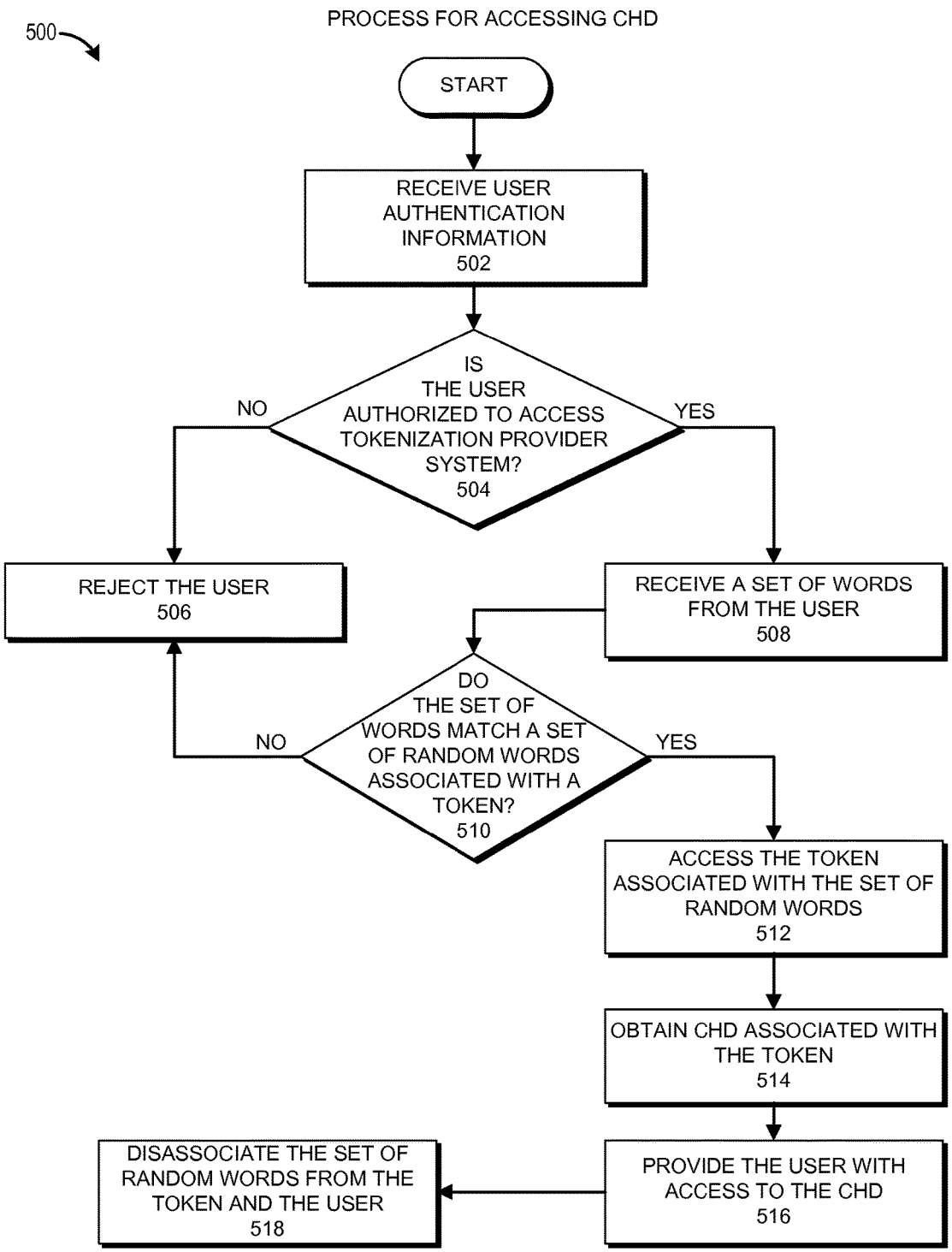
FIG. 5 illustrates a flow diagram for a second example embodiment of a process for accessing cardholder data.

FIG. 5 illustrates a flow diagram for a second example embodiment of a process 500 for accessing cardholder data. The process 500 can be implemented by any system that can provide a second merchant, such as the third-party merchant 162, with CHD associated with a token, which was created in response to a first merchant, such as the merchant 142, providing the CHD to the system or a related system. For example, the process 500, in whole or in part, can be implemented by one or more of the token access system 122, the CHD access system 124, and the gateway 126. In one embodiment, the second merchant can be a merchant that is associated with the merchant 142, such as an employee of the merchant 142. In one embodiment, the process 500 can be used by the merchant 142, who initially provided the CHD, or an employee of the merchant 142, to retrieve the CHD. Further, the process 500 can be used by the third-party merchant 162 to access CHD from any number of merchants who have authorized the third-party merchant 162 to use their tokens. Although any number of systems, in whole or in part, can implement the process 500, to simplify discussion, the process 500 will be described as being generally implemented by the CHD access system 124.

The process 500 begins at block 502, where, for example, the CHD access system 124 receives user authentication information associated with the third-party merchant 162. This user authentication information can generally include any information that can be used to authenticate the third-party merchant 162. For example, the user authentication information can include: a user name, a password, a RSA token code, and the response to a challenge-response test, such as a captcha response or an answer to a security question.

At decision block 504, the CHD access system 124 determines, based at least in part on the user authentication information, if the third-party merchant 162 is authorized to access the tokenization provider system 102, or any system associated with the tokenization provider system 102. In one embodiment, decision block 504 can include determining if the third-party merchant 162 is registered with the tokenization provider system 102. In one embodiment, decision block 504 can include determining if the merchant 142, or the admin 148, has provided the third-party merchant 162 with access to tokens associated with the merchant 142 or the merchant environment 104.

If the third-party merchant 162 is not authorized to use the tokenization provider system 102, the CHD access system rejects the third-party merchant 162 at block 506. In one embodiment, rejecting the third-party merchant 162 can comprise initiating a registration process that enables the third-party merchant 162 to register with the tokenization provider system 102. In one embodiment, rejecting the third-party merchant 162 can comprise providing an error message to the third-party merchant 162.

If the third-party merchant 162 is authorized to access the tokenization provider system 102, the CHD access system 124 receives a set of words from the third-party merchant 162 at block 508. Alternatively, or additionally, the CHD access system 124 receives any authorization factor generated by the authorization factor generator 128 and provided to the third-party merchant 162 as part of the implementation of the process 400.

At decision block 510, the CHD access system 124 determines if the set of words received from the third-party merchant 162 match a set of random words associated with a token. In one embodiment, the third-party merchant 162 also identifies the token. Alternatively, the CHD access system 124 identifies the token by determining if there exists any token associated with a set of random words that match the received set of words and if so, the CHD access system 124 determines if the third-party merchant 162 is authorized to access that token.

If the set of words received from the third-party merchant 162 do not match a set of random words associated with a token, the CHD access system 124 rejects the third-party merchant 162 at block 506. Rejecting the third-party merchant 162 can comprise causing an error message to be presented to the third-party merchant 162. Further, in some embodiments, rejecting the third-party merchant 162 can cause an account associated with the third-party merchant 162 to be deactivated or suspended.

If the set of words received from the third-party merchant 162 matches a set of random words associated with a token, the CHD access system 124, at block 512, accesses the token associated with the set of random words at, for example, the tokenization provider repository system 130. At block 514, the CHD access system 124 obtains CHD associated with the token.

At block 516, the CHD access system 124 provides the third-party merchant 162 with access to the CHD over a secure connection. In one embodiment, the CHD is provided via the network 170. In one embodiment, the CHD is provided to the computing system 164 at block 516. The computing system 164 can then provide the CHD directly to the POS 166 and/or cause the CHD to be presented to the third-party merchant 162. In one embodiment, the CHD is provided to the POS 166 at block 516. The POS 166 can then provide the CHD to the credit card processor 174 to complete a transaction.

In one embodiment, providing the third-party merchant 162 with access to the CHD can comprise the CHD access system 124 receiving transaction information associated with a requested transaction. The CHD access system 124 can then provide the CHD and the transaction information to the gateway 126, which can then process the transaction using the credit card processors 172. Advantageously, in some embodiments, the third-party merchant 162 is able to use the CHD without the CHD being presented to the third-party merchant 162. In one embodiment, a subset of the CHD is presented to the third-party merchant 162 enabling the third-party merchant 162 to log the transaction and/or to verify that the transaction is associated with the correct CHD or customer. In some embodiments, the CHD access system 124 may verify that the value of the transaction does not exceed a pre-defined transaction-limit associated with the third-party merchant's 162 access of the CHD. If the transaction-limit is exceeded, the CHD access system 124 can reject the transaction. Further, the CHD access system 124 can report the attempted transaction to the merchant 142 or the admin 148. The CHD access system 124 can also report successful transactions to the merchant 142 thereby enabling the merchant 142 to verify that the third-party merchant 162 processed the transaction for the merchant's 142 customer.

In one embodiment, the CHD access system 124 logs each access and/or attempted access of the token and/or CHD at the CHD access log repository 136. Advantageously, in some embodiments, if there is a disputed credit card use, the CHD access log repository 136 can be accessed to determine what parties may have accessed the token and/or CHD around the time associated with the disputed credit card use.

At block 518, the CHD access system 124 disassociates the set of random words from the token and the third-party merchant 162. In one embodiment, disassociating the set of random words can include deleting or removing the words from the tokenization provider system 102. In one embodiment, block 518 is performed in response to the third-party merchant 162 accessing the token and/or CHD. In one embodiment, block 518 is performed in response to a pre-defined event. This pre-defined event can include any event associated with the token and/or CHD. For example, the pre-defined event can comprise: the number of times the set of random words have been provided by the third-party merchant 162 to the tokenization provider system 102 (e.g. once, or five times); the length of time since the set of random words were associated with the token (e.g. 15-minutes); or the length of time since the third-party merchant 162 first accessed the token and/or CHD, to name a few.

Further, in some embodiments, the CHD access system 124 may disassociate the set of random words from the token without the third-party merchant 162 having ever accessed or attempted to access the CHD. For example, if the pre-defined event is a time-limit or time-period, the CHD access system 124 can disassociate the set of random words from the token at the expiration of the time-limit or time-period whether or not the third-party merchant 162 accessed the CHD. In addition, if the owner of the token (e.g. the merchant 142) ceases to trust the third-party merchant 162, the token owner can access the tokenization provider system 102 and remove the third-party merchant's 162 authorization to access the token, and thus the CHD associated with the token. Removing the authorization to access the token may include disassociating the set of random words from the token prior to the pre-defined event occurring.

In one embodiment, the third-party merchant 162 can communicate with the CHD access system 124 using any secure system. For example, the third-party merchant 162 can provide the user authentication information or the set of random words using a secure portal or webpage associated with the tokenization provider system 102. Alternatively, the third-party merchant 162 can use a virtual private network (VPN) or a secure application obtained from the tokenization provider system 102 to access the tokenization provider system 102 and to provide the user authentication information or the set of random words to the CHD access system 124.

Advantageously, in some embodiments, a merchant can use the process 200 or 400 to reduce CHD misuse or the misappropriation of CHD by a malicious user because the CHD is not stored with the merchant. Further, in some embodiments, using the process 300 or 500, the merchant can provide CHD to a third-party merchant who may not be a customer of the tokenization provider system or who may not be capable of interacting with the tokenization provider system due to, for example, differing CHD processing systems or legal regulations in the third-party merchant's country or jurisdiction. Similarly, in some embodiments, the merchant can use the process 300 or 500 to require CHD to complete a transaction with a bank or credit card processor whose payment card processing systems may not be capable of interacting with the tokenization provider system.

Example Information Flow

Figure 6:
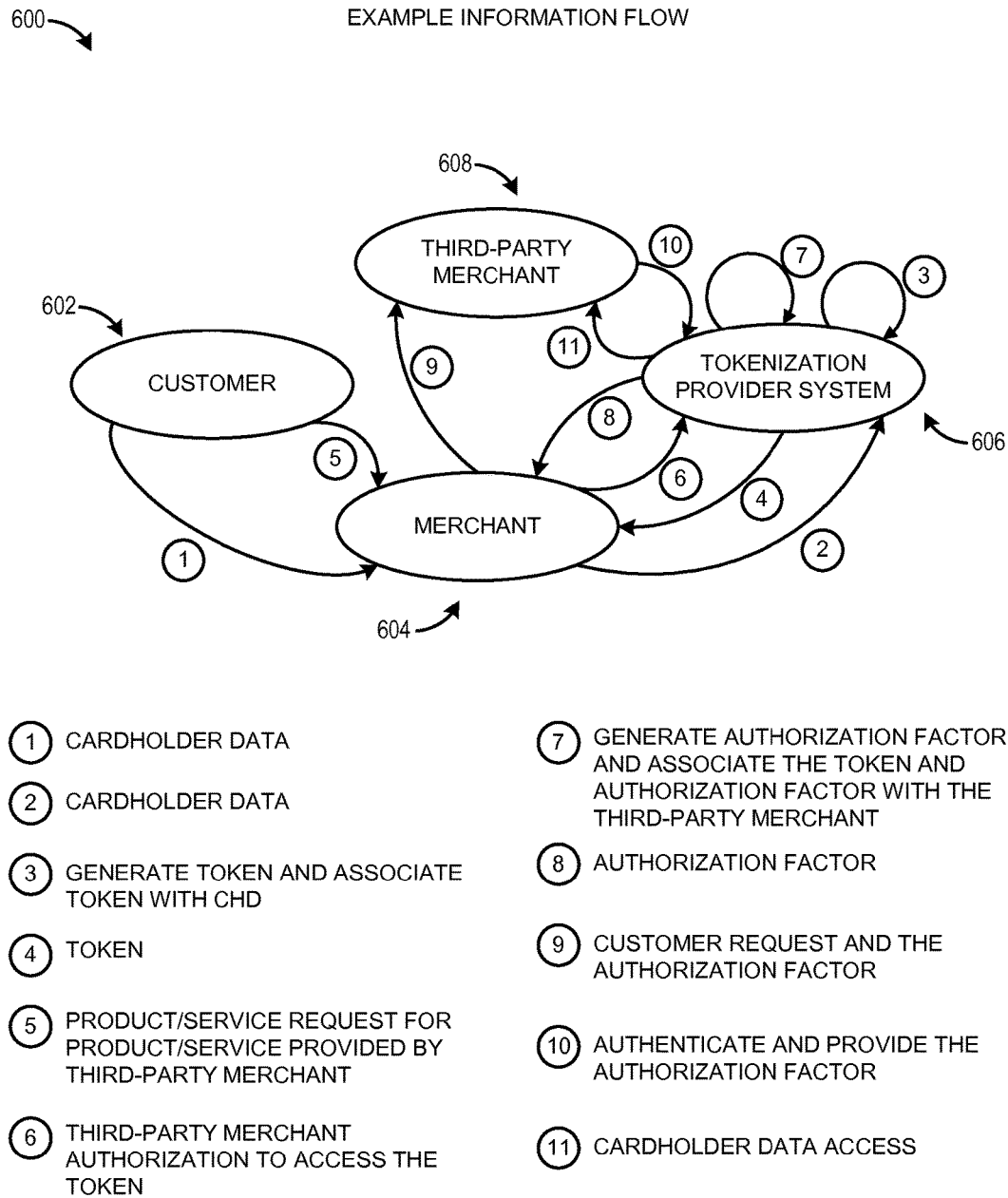
FIG. 6 illustrates a flow diagram for an example flow of information using a tokenization provider system.

FIG. 6 illustrates a flow diagram for an example flow 600 of information using a tokenization provider system 606. Some or all of the systems described herein can be used to facilitate the flow illustrated in FIG. 6. For example, the interaction with the merchant 604 can be via a computing system associated with the merchant 604. As a second example, interaction with the third-party merchant may be via a POS.

The flow 600 begins at event 1 with the customer 602 providing CHD to the merchant 604. This CHD is then provided by the merchant 604 to the tokenization provider system 606 at event 2. At event 3, the tokenization provider system 606 generates a token and associates the token with the CHD. This token is provided to the merchant at event 4. Generally, but not necessarily, the merchant 604 can store the token in place of the CHD and can destroy or not save any copies of the CHD that the merchant 604 received. In other embodiments, the merchant 604 generates the token or at least a portion of the token instead of (or in addition to) the tokenization provider system 606.

At event 5, the customer 602 provides a product or service request to the merchant 604 for a product or service that may be provided by the third-party merchant 608. For example, the request may be for opera tickets, flowers, or for an appointment at a spa. At event 6, the merchant 604 authorizes the third-party merchant 608 to access the token at the tokenization provider system 606 by communicating the authorization to the tokenization provider system 606. The tokenization provider system 606, at event 7, generates an authorization factor, such as a set of four random words, and associates the third-party merchant with the authorization factor and the token.

At event 8, the tokenization provider system 606 provides the authorization factor to the merchant 604, such as by email or through a web-portal. The merchant 604 provides the authorization factor and the customer's 602 product or service request to the third-party merchant 608 at event 9. At event 10, the third-party merchant 608 authenticates with the tokenization provider system 606. The third-party merchant 608 also provides the authorization factor to the tokenization provider system 606 at event 10. In some embodiments, authenticating and providing the authorization factor may be two separate events.

Assuming that the third-party merchant 608 is authenticated and that the tokenization provider system 606 determines that the third-party merchant 608 is authorized to access the token, the tokenization provider system 606 provides access to the CHD associated with the token at event 11. In some embodiments, providing access to the CHD may include providing the CHD to the third-party merchant 608.

The flow of information illustrated in FIG. 6 is for illustrative purposes and is not intended to be limiting. For example, in some cases, instead of, or in addition to, the tokenization provider system 606 providing the authorization factor to the merchant 604 at event 8, the tokenization provider system 606 can provide the authorization factor to the third-party merchant 608.

Examples of CHD Interface Screens

FIGS. 7-12 illustrate several non-limiting embodiments of interface screens that can be electronically generated by one or more of the tokenization provider system 102, the token access system 122, or any other system that can regulate the access of CHD associated with a token. Although the interface screens are illustrated as Graphical User Interfaces (GUIs), the interface screens are not limited as such. For example, the interface screens can include command-line interfaces (CLIs), three-dimensional interfaces, or a combination of interface types.

A user, such as the third-party merchant 162, can access the interface screens illustrated in FIGS. 7-12 using a POS 166, a computing system 164, or the like. In some embodiments, some or all of the interface screens may be included as part of a web-based or Internet-based software application that is accessed via a network 170. Alternatively, some or all of the interface screens may be part of a client-side software application stored locally, such as on the computing system 164, which can communicate over the network 170 with a server-side application stored on, for example, the token access system 122.

Figure 7:
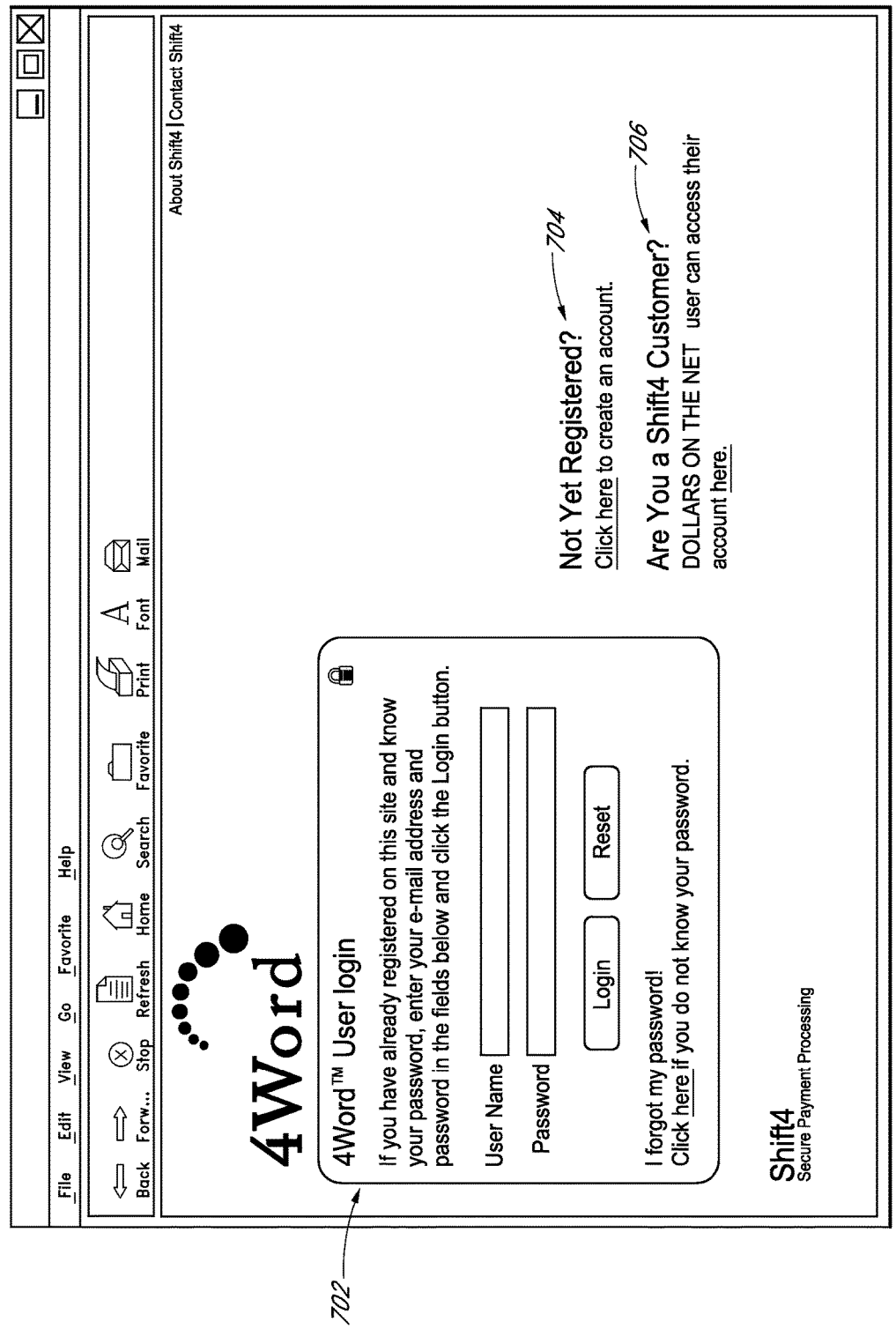
FIG. 7 illustrates an example embodiment of a user login interface.

FIG. 7 illustrates an embodiment of a user login interface 700. In some embodiments, the user login interface 700 enables a user (e.g. the third-party merchant 162) who desires to access CHD associated with another user's token (e.g. the merchant 142 or organization associated with the merchant 142) to access the token access system 122. In some embodiments, users who desire to provide token access to another party (e.g. a user or organization) can use the user login interface 700 to access the token access system 122. The third-party merchant 162 can provide a user name and password using the login panel 702 to authenticate with the token access system 122. Other authentication mechanisms are possible. For example, the login panel 702 can present the third-party merchant 162 with an opportunity to present a unique cryptographic identifier or key. This key, in certain embodiments, can then be matched to or decrypted with a corresponding public key to authenticate the third-party merchant 162.

The user login interface 700 includes a registration link 704. This registration link 704 can be used to direct an unregistered user to a registration screen, such as the user registration interface 800 depicted in FIG. 8. Further, the user login interface 700 can also include a login link 706 that can be used to direct a user (e.g. the merchant 142) who is registered with the tokenization provider system 102 to another login interface. This additional login interface can be user by subscribers of the tokenization provider system 102 to manage token access, such as to grant token access to third-party merchant organizations and/or users.

Figure 8:
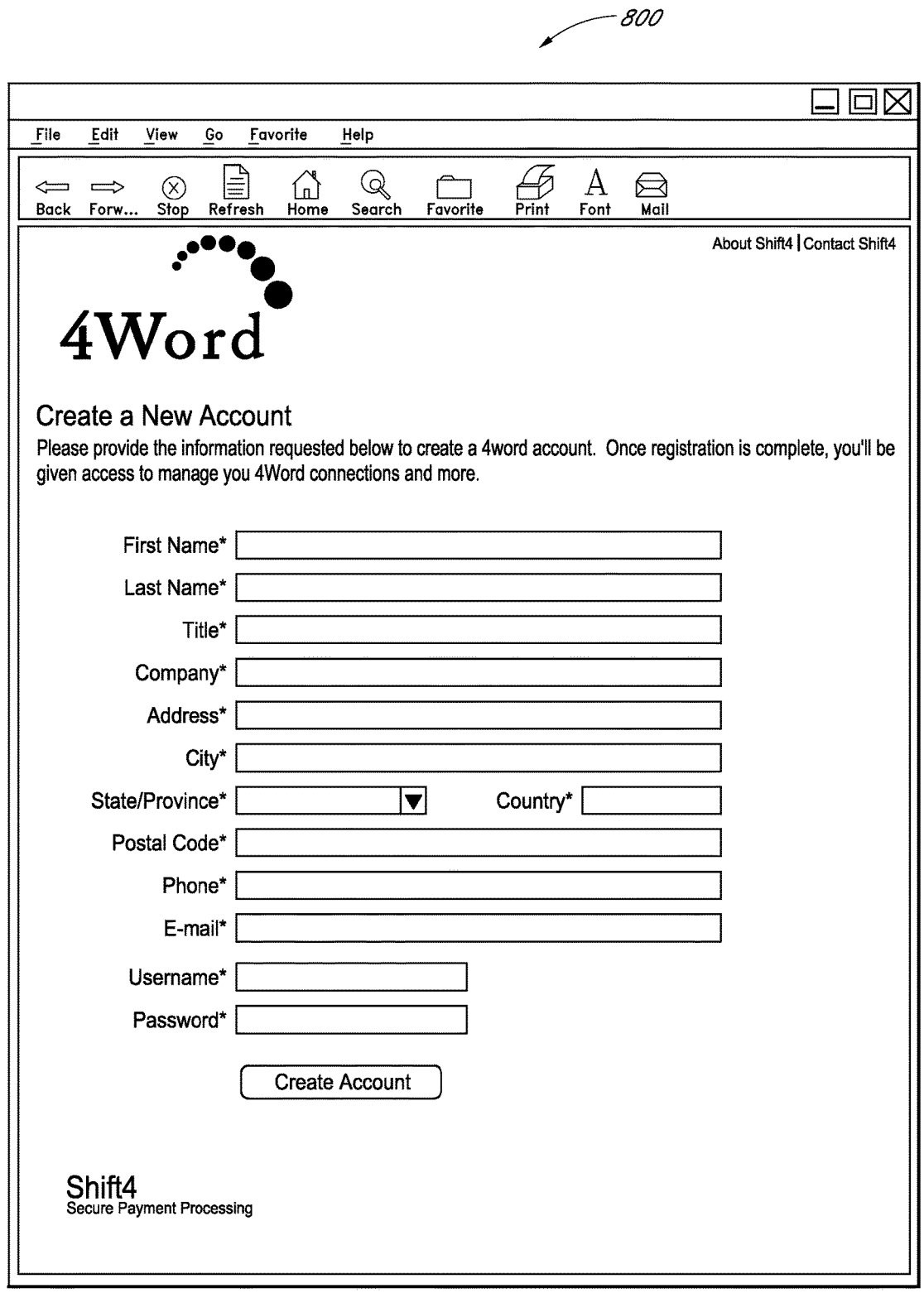
FIG. 8 illustrates an example embodiment of a user registration interface.

FIG. 8 illustrates an embodiment of a user registration interface 800. The user registration interface 800 enables a user to register with the token access system 122 by providing, for example, contact information, a username, and a password. The user registration interface 800 can be used, for example, by the third-party merchant 162 of FIG. 1, who may not necessarily be a customer of the provider of the tokenization provider system 102. By registering with the token access system 122, in some embodiments, the third-party merchant 162 can access CHD associated with tokens that have been associated with the third-party merchant 162 or the third-party merchant environment 106 by the user who is a customer of the organization associated with the tokenization provider system 102.

In some embodiments, a merchant 142 or an organization associated with the merchant environment 104 that is a customer of the organization associated with the tokenization provider system 102 can use the user registration interface 800 to register an account with the token access system 122. Advantageously, in certain embodiments, this enables merchants to share access to CHD and/or tokens with other merchants whether or not the other merchants are customers of the tokenization provider system 102.

Figure 9:
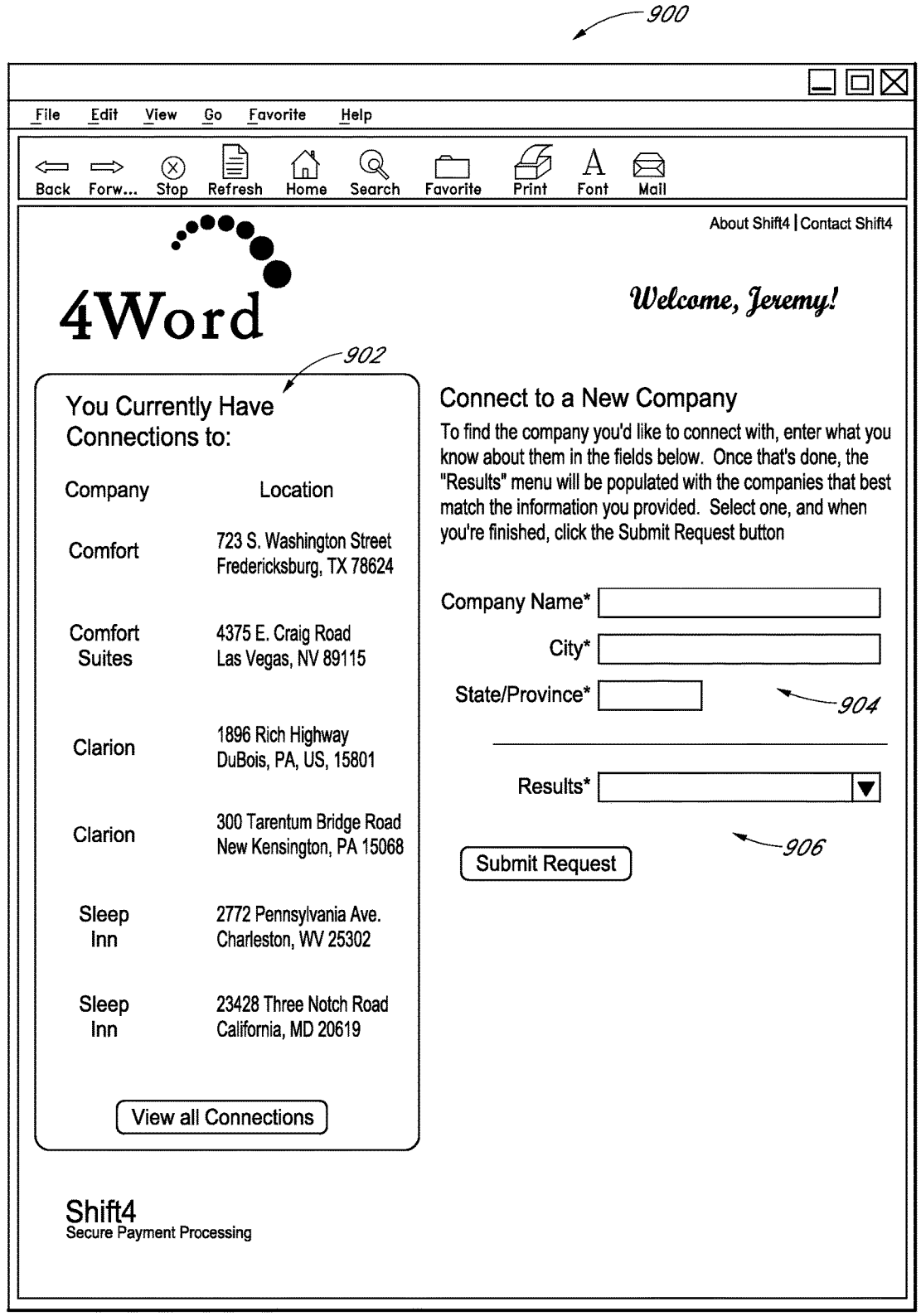
FIG. 9 illustrates an example embodiment of a merchant selection interface.

FIG. 9 illustrates an embodiment of a merchant selection interface 900. The merchant selection interface 900 enables a user (e.g. the third-party merchant 162) to select or connect to another user or associated organization (e.g. a merchant 142, a merchant environment 104, or an organization associated with the merchant environment 104) that has provided token access to the user or an organization associated with the user (e.g. the user's employer). For example, the third-party merchant 162 can use the merchant selection interface 900 to select the organization associated with the merchant environment 104. In some embodiments, the third-party merchant 162 can select the merchant environment 104. For example, if the merchant organization is a hotel chain, the third-party merchant 162 can select a specific franchise, location, or branch of the hotel chain using the merchant selection interface 900.

In some embodiments, the merchant selection interface 900 enables the third-party merchant 162 to select any organization (or user) registered with the tokenization provider system 102. Alternatively, the merchant selection interface 900 may be configured to enable the third-party merchant 162 to select organizations (or users) that are currently sharing a token with the third-party merchant 162. In some cases, the third-party merchant 162 may be able to select any organization (or user) that has shared a token with the third-party merchant 162 at some point, whether or not the organization is currently sharing a token with the third-party merchant 162.

The merchant selection interface 900 can include an existing connections panel 902. The existing connections panel 902 can list some or all of the users or organizations with whom the third-party merchant 162 is currently connected. In some embodiments, the existing connections panel 902 may list organizations that are sharing a token with the third-party merchant 162. Alternatively, the existing connections panel 902 may list any organization with which the third-party merchant 162 has established a connection. In some embodiments, the third-party merchant 162 can select organizations with which to connect. For some embodiments, organizations that are sharing tokens with the third-party merchant 162 (or an associated organization) are automatically connected to the third-party merchant 162 and may automatically be listed on the existing connections panel 902.

The existing connections panel 902 can list connections in any order. For example, the existing connection panel 902 may list the organizations that are currently sharing a connection before displaying other connections. Alternatively, for example, organizations may be listed in alphabetical order, by frequency of access, or based on when the organization was added to the list.

In some implementations, the merchant selection interface 900 can include one or more search fields 904 for locating organizations that may have shared a token with the third-party merchant 162 (or an associated organization). These search fields 904 can include, for example, a name field, a city field, an address field, or a product or service field (e.g. electronics, hospitality, restaurants, etc.), to name a few. In some cases, the search fields 904 may be used to search for an organization that is known to the tokenization provider system 102 or that has registered with the tokenization provider system 102.

The results list 906 can list the organizations identified based on the information supplied to the search fields 904. Although illustrated as a drop-down list, the results list 906 is not limited as such and may include any type of GUI element, or other interface element, for displaying the list of results. For example, the results list 906 may include a dialog box, pop-up dialog box, a combo box, or other GUI element.

Figure 10:
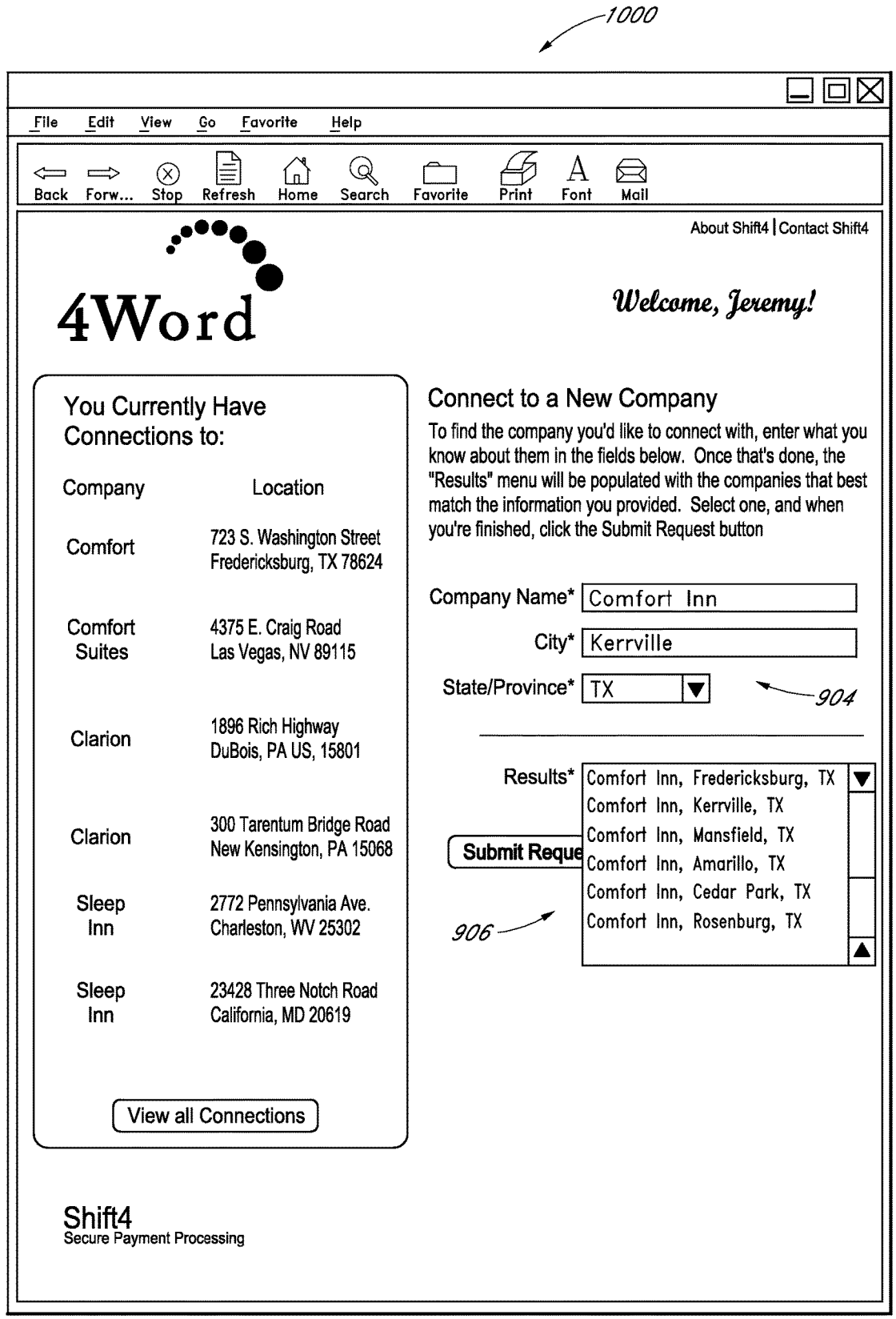
FIG. 10 illustrates an example embodiment of a populated merchant selection interface.

FIG. 10 illustrates an example embodiment of a populated merchant selection interface 1000. The populated merchant selection interface 1000 is substantially similar to the merchant selection interface 900. However, the search fields 904 and the results list 906 of the populated merchant selection interface 1000 illustrate sample search information and sample results respectively.

Figure 11:
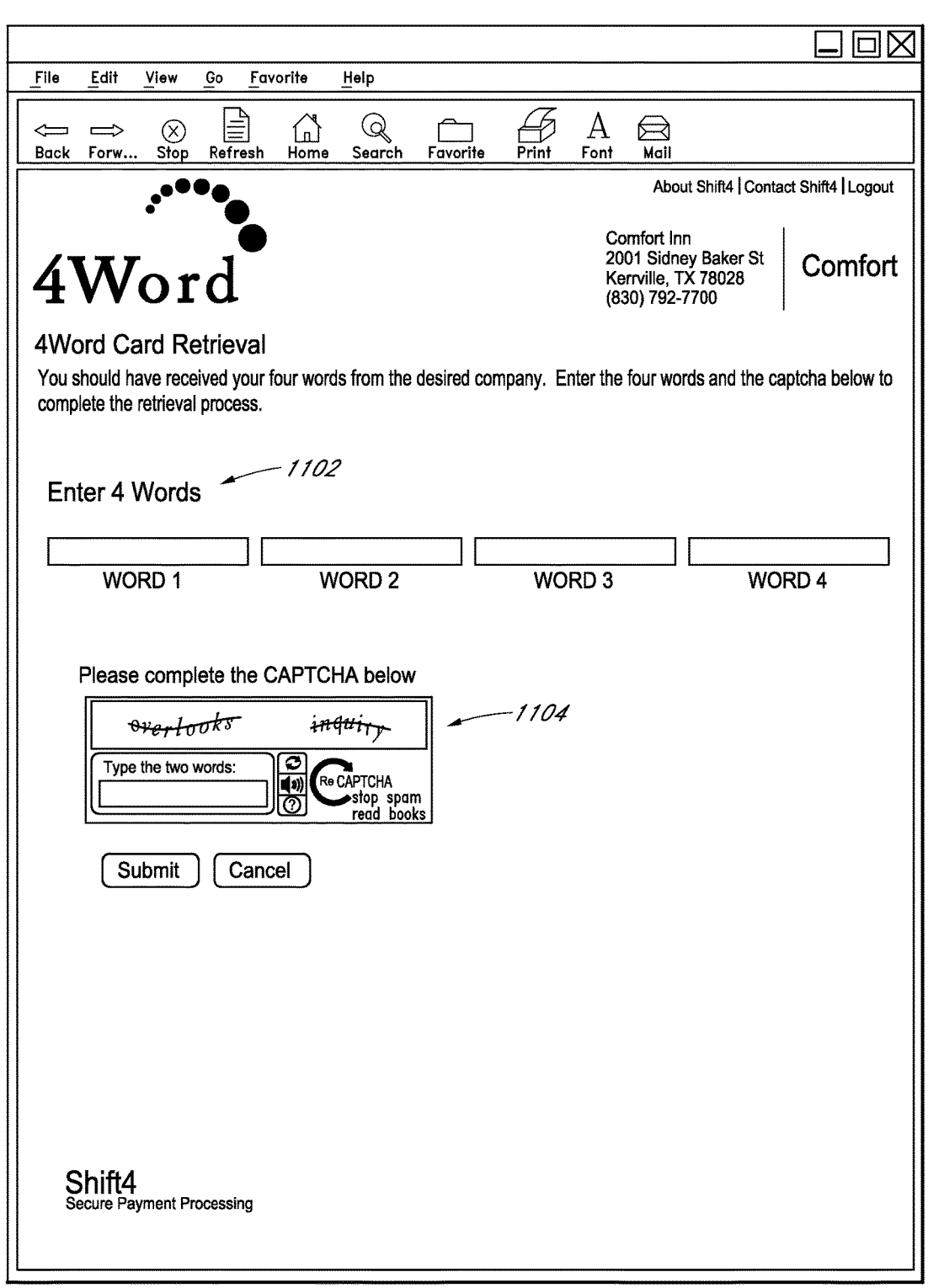
FIG. 11 illustrates an example embodiment of a CHD access interface.

FIG. 11 illustrates an example embodiment of a CHD access interface 1100. The CHD access interface 1100 enables the third-party merchant 162 (or other user) to access CHD associated with a token that has been shared with the third-party merchant 162 or an associated organization of the third-party merchant 162. To access the CHD, in certain embodiments, the third-party merchant 162 can provide an authorization factor associated with the token that is associated with the CHD. As has previously been described, the authorization factor can be, for example, a set of four words. Further, the third-party merchant 162 can provide the authorization factor via authorization fields 1102. Authorization fields 1102 can include any GUI element for providing the authorization factor including, for example, a GUI element that allows for the uploading of an authentication file, such as a cryptographic key associated with the third-party merchant 162. In the illustrated embodiment, the authorization fields 1102 include four text fields for entering the authorization factor.

The CHD access interface 1100 may also include a challenge-response mechanism 1104. This challenge-response mechanism 1104 can include any mechanism for preventing automated systems, such as Internet bots, from accessing CHD using the CHD access interface 1100. For example, the challenge-response mechanism can include a security question, a Completely Automated Public Turing test to tell Computers and Humans Apart (CAPTCHA) (as illustrated in FIG. 11), combinations of the same, or the like.

Figure 12:
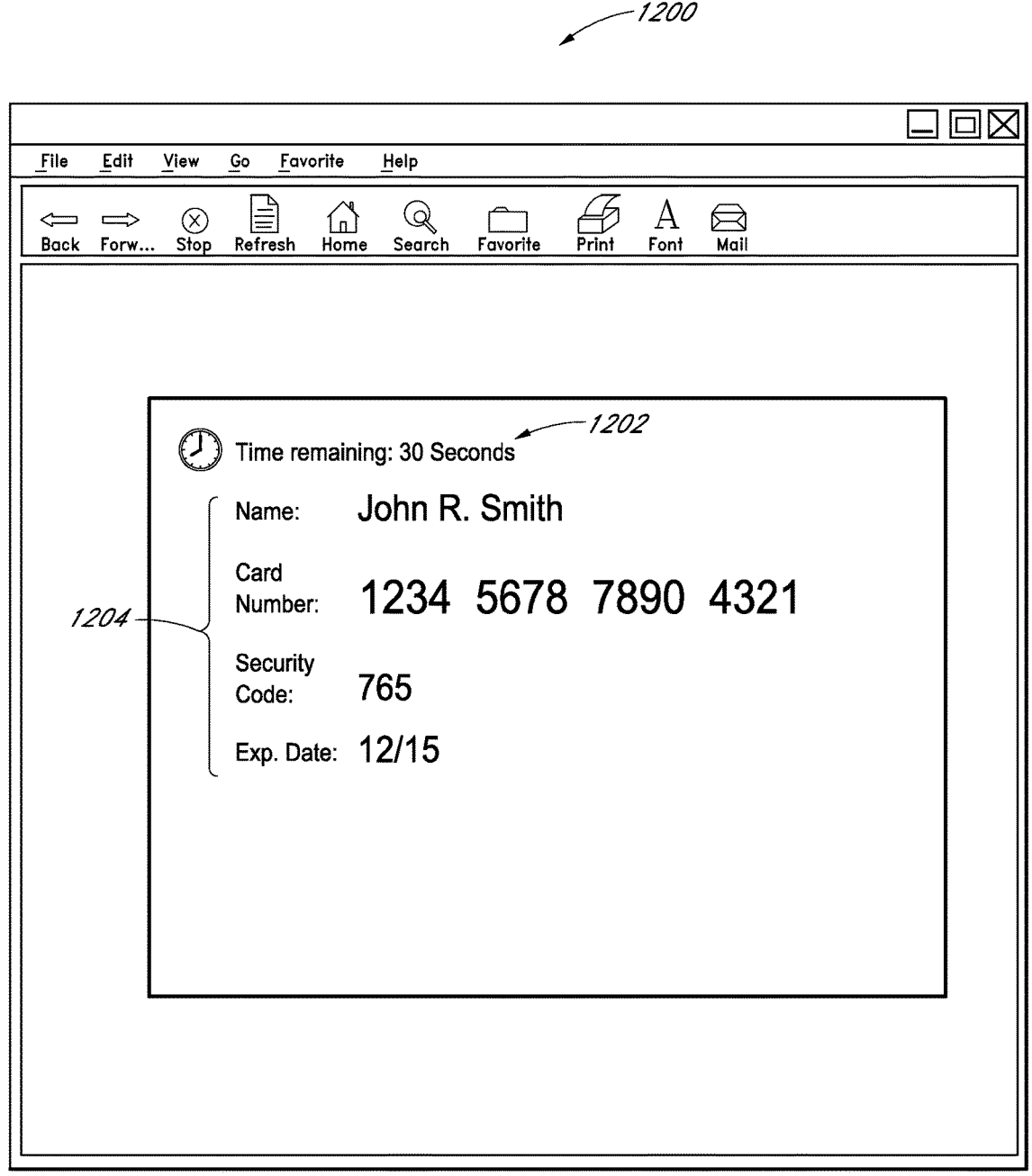
FIG. 12 illustrates an example of a CHD provisioning interface.

FIG. 12 illustrates an example of a CHD provisioning interface 1200. The CHD provisioning interface 1200 can present CHD via CHD fields 1204 to a user, such as the third-party merchant 162. Further, the CHD provisioning interface 1200 can include a timer 1202 that identifies how much time is remaining for the third-party merchant 162 to access the CHD before the CHD is cleared from the CHD provisioning interface 1200.

In some embodiments, the CHD provisioning interface 1200 includes GUI fields for specifying a transaction. Advantageously, in certain embodiments, the tokenization provider system 102 can perform the transaction for the third-party merchant 162. Thus, in some embodiments, the CHD provisioning interface 1200 may not present the CHD to the third-party merchant 162. However, the CHD provisioning interface 1200 may present the status of the transaction, including a confirmation value.

Second Example Token-Sharing Environment

Figure 13:
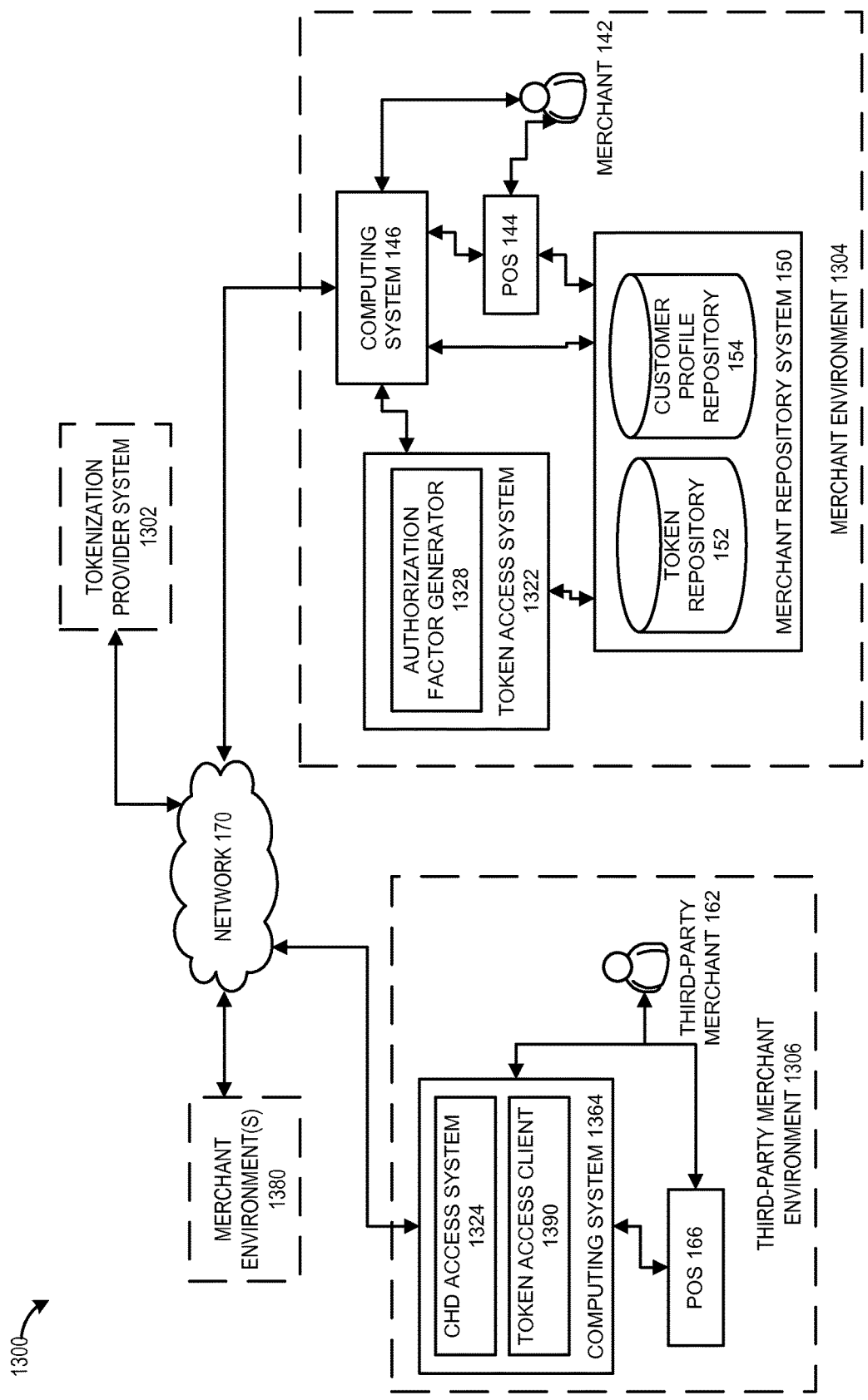
FIG. 13 illustrates an example embodiment of a token-sharing environment.

FIG. 13 illustrates an example embodiment of a token-sharing environment 1300. The token-sharing environment 1300 illustrates an example embodiment of merchant environments managing, at least in part, their own token access systems. Further, the token-sharing environment 1300 illustrates an example of a third-party merchant environment 1306 accessing tokens from other merchant environments (e.g., the merchant environment 1304). Reference numbers from FIG. 1 are re-used to indicate correspondence between referenced elements in FIG. 1 and in FIG. 13 and, to simplify discussion, descriptions of these corresponding elements are not repeated with respect to FIG. 13.

Similar to the token-sharing environment 100, the token-sharing environment 1300 can include a tokenization provider system 1302, a merchant environment 1304, and a third-party merchant environment 1306. Further, the token-sharing environment 1300 may include one or more merchant environments 1380. In addition, although not depicted, the token-sharing environment 1300 may include a number of credit card processors.

Although FIG. 13 does not illustrate any systems or subsystems associated with the tokenization provider system 1302, in certain embodiments, the tokenization provider system 1302 may include some or all of the systems included by the tokenization provider system 102. Further, the tokenization provider system 1302 may include some or all of the embodiments described above with relation to the tokenization provider system 102. Similarly, the merchant environment 1304 and the third-party merchant environment 1306 may each include some or all of the embodiments described above with relation to the merchant environment 104 and the third-party merchant environment 106.

The one or more merchant environments 1380 may include any number or type of systems and configurations. In some cases, some or all of the merchant environments 1380 may include at least some systems and configurations associated with the merchant environment 104, the merchant environment 1304, the third-party merchant environment 106, and/or the third-party merchant environment 1306. Further, at least some of the merchant environments 1380 may use tokenization, or include a token access system or other system associated with accessing and/or sharing tokens.

In some embodiments, a merchant 142 associated with the merchant environment 1304 may obtain a token for a set of CHD. The merchant 142 may obtain this token by, for example, swiping a credit card through the POS 144 or entering CHD into the POS 144, which is then provided to a tokenization system (e.g., the tokenization provider system 1302), which provides the token to the merchant 142, or to a system associated with the merchant environment 1304 (e.g., the POS 144 or the token repository 152).

The merchant 142, using for example the token access system 1322, may cause the token to be associated with the third-party merchant environment 1306 and/or one or more of the merchant environments 1380. Associating the token with the third-party merchant environment 1306 may occur in response to a request from the third-party merchant 162, or another employee of the third-party merchant 1306, or in response to a request from a customer of the merchant environment 1304 who, for example, may be considering using the services of the third-party merchant environment 1306. Advantageously, in some embodiments, by sharing the token with the third-party environment 1306, the customer or an employee of the merchant environment 1304 can purchase products or services from the third-party merchant environment 1306 without accessing the CHD. In some cases, associating the token with the third-party merchant environment 1306 may occur in response to a request by the merchant 142. Advantageously, in certain embodiments, the merchant 142 can cause the token to be associated with the third-party merchant environment 1306 before, or without, the third-party merchant 162 requesting access to the token.

Associating the token with the third-party merchant environment 1306 can include generating an authorization factor using, for example, the authorization factor generator 1328. Once the authorization factor is generated, it may be provided to the third-party merchant 162 under the control of the merchant 142, or in response to the merchant 142 associating the token with the third-party merchant environment 1306. In some embodiments, the authorization factor generator 1328 can include some or all of the features described above with respect to the authorization factor generation 128.

In some situations, the third-party merchant 162 may require access to the CHD associated with the token. For example, the third-party merchant 162 may want access to the CHD before completing a transaction to provide a service or product to a customer of the merchant 142. As described previously, in some cases, accessing the CHD may include obtaining the CHD. In some cases, accessing the CHD may include the ability to use the CHD, but may or may not include obtaining the CHD or having the ability to view the CHD. Although in some cases the inability to view the CHD prevents a merchant from viewing all the CHD, in many cases at least some of the CHD may be viewable. For example, although the third-party merchant 162 may not be able to view an account number, the third-party merchant 162 may be able to view the name of the cardholder.

To use or access the CHD, the third-party merchant 162 may use the computing system 1364 to communicate with a token access system 1322 associated with the merchant environment 1304. In some cases, the computing system 1364 may include a token access client 1390. In other cases, the token access client 1390 may be implemented as a separate system from the computing system 1364. For some cases where the token access client 1390 is a separate system, the third-party merchant 162 may access the token access client 1390 directly. In other cases, the third-party merchant 162 may access the token access client 1390 via the computing system 1364.

The computing system 1364 can generally include any type of computing system. In some implementations, the computing system 1364 may be a general purpose computing system, such as a desktop, laptop, or tablet, which may include the functionality of the CHD access system 1324 and/or the token access client 1390 through, for example, a software application or a hardware add-on (e.g., a dongle, an expansion card, or a USB connectable device). In other implementations, the computing system 1364 may be a special purpose computing system which may include one or more hardware or software modules configured to provide the functionality of the CHD access system 1324 and/or the token access client 1390. In some embodiments, the computing system 1364 can include some or all of the features described above with respect to the computing systems 146 and 164.

The token access client 1390 can generally include any system that is capable of identifying a token source for obtaining access to a token associated with CHD. For example, the token source may include the merchant environment 1304 or the tokenization provider system 1302. In some cases, the token access client 1390 may identify the token source based on the authorization factor provided to the third-party merchant environment 1306 by the merchant environment 1304 using, for example, the token access system 1322. In other cases, the third-party merchant 162 may configure the token access client 1390 with the identity of the token source. In some cases, the token access system 1322 may identify the merchant environment 1304 as the token source when providing the authorization factor to the third-party merchant 162 or the third-party merchant environment 1306.

Using the token access client 1390, the third-party merchant 162 may request access to a token from the merchant environment 1304. This request may be provided to the token access system 1322. The token access system 1322 can include any system that can generate tokens and provide access to the tokens to a merchant or employee of a merchant environment including the third-party merchant environment 1306. As illustrated, the token access system 1322 may be located at the merchant environment 1304 in its entirety. However, in some cases, the token access system 1322 may be a distributed system. Further, in some cases, the token access system 1322 may be split between the merchant environment 1304 and the tokenization provider system 1302. In some implementations, the token access system 1322 may represent a thin client, which can provide an Application Programming Interface (API) or any other type of interface for accessing a third-party token access system, which may be hosted by another merchant environment, a tokenization provider system 1302, a token hosting service provider (not shown), or any other system that can store and/or regulate access to tokens. In some embodiments, the token access system 1322 can include some or all of the features described above with relation to the token access system 122. The token access system 1322 can include an authorization factor generator 1328, which, as described above, can provide an authorization factor associated with a token. In some embodiments, the token access client 1390 may determine the merchant environment, or token access system of the merchant environment, to contact based on one or more of an authorization factor, a merchant identifier, or indication of the third-party merchant 162. Thus, the token access client 1390 can determine whether to communicate with the token access system 1322 or a token access system associated with one of the merchant environments 1380.

As part of the request to access the token from the merchant environment 1304, or in response to a prompt from the token access system 1322, the third-party merchant 162 may provide an authorization factor to the token access system 1322. If the token access system determines that the third-party merchant 162, or another employee of the third-party merchant environment 1306, is authorized to access the token, the token access system 1322 may provide the token to the third-party merchant environment 1306. The third-party merchant 162 can then use the CHD access system 1324 to access CHD associated with the token. Accessing the CHD can include the CHD access system 1324 providing the received token to the tokenization provider system 1302 and requesting access to the associated CHD. The tokenization provider system 1302 may then provide the third-party merchant 162 with access to the CHD associated with the token. As previously described, providing access to the CHD can include providing the CHD to the third-party merchant 162 or enabling the third-party merchant 162 to complete a transaction using the CHD with or without providing the CHD to the third-party merchant 162.

In some embodiments, the token access system 1322 may include the CHD access system 1324. In some cases, in response to the request to access the token, the token access system 1322 may use the CHD access system 1324 to obtain access to the CHD on behalf of the third-party merchant 1306. The third-party merchant 162 can provide transaction details, such as the price of a product, to the token access system 1322 at the merchant environment 1304, and the token access system 1322 can complete the transaction for the third-party merchant environment 1306 and provide a confirmation to the third-party merchant 162. In some embodiments, the CHD access system 1324 can include some or all of the features described above with respect to the CHD access system 124.

In some embodiments, some or all of the process 200 and/or the process 400 may be performed by a system associated with the merchant environment 1304 to associate a token with the third-party merchant environment 1306. For example, in some embodiments, the token access system 1322 may be configured to perform one or more of the operations associated with the process 200 and/or the process 400. For instance, the token access system 1322 may receive a request to associate a token with the third-party merchant environment 1306. If the third-party merchant environment 1306 is authorized to access the tokens of the merchant environment 1304, the token access system 1322 may generate a set of random words, or some other authorization factor, and associate the set of random words with the token and the third-party merchant environment 1306, or an employee thereof (e.g., the third-party merchant 162). The token access system 1322 can then provide the set of random words to the third-party merchant environment 1306 or the third-party merchant 162.

Example Process for Accessing a Token

Figure 14:
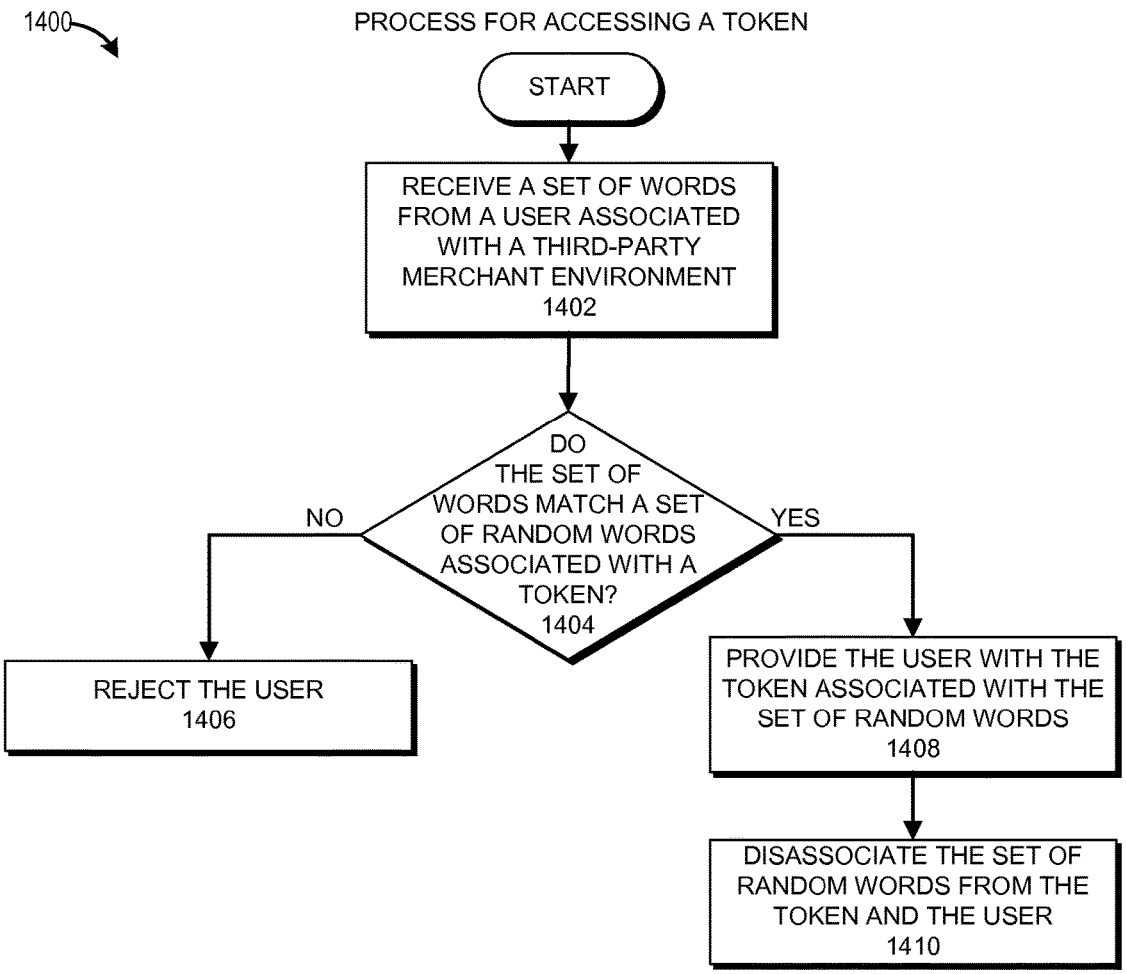
FIG. 14 illustrates a flow diagram for an example embodiment of a process for accessing a token.

FIG. 14 illustrates a flow diagram for an example embodiment of a process 1400 for accessing a token. The process 1400 can be implemented by any system that can provide a second merchant, such as the third-party merchant 162, with access to a token created in response to a first merchant, such as the merchant 142, providing CHD to a tokenization system. For example, the process 1400, in whole or in part, can be implemented by one or more of the token access system 1322, the computing system 146, and the tokenization provider system 1302. Although any number of systems, in whole or in part, can implement the process 1400, to simplify discussion, the process 1400 will be described as being generally implemented by the token access system 1322.

The process 1400 begins at block 1402 where, for example, the token access system 1322 receives a set of words from a user (e.g., the third-party merchant 162) associated with the third-party merchant environment 1306. The token access system 1322 can compare the received set of words to a set of words associated with tokens stored at the token repository 152 to determine if the user is authorized to access one or more of the tokens. Although the process 1400 is described with respect to a set of words, it is possible to perform the process 1400 using any type of authorization factor including those previously described above. Further, in some cases, multiple checks may be performed. For instance, the process 1400 can include determining whether a password matches a user, and if so, the process 1400 can then include a token identification check based on, for example, a set of words, as described above.

In some embodiments, the block 1402 includes authenticating the user. Authenticating the user may also include determining whether the user or the third-party merchant environment 1306 is authorized to provide the set of words or to access the tokens of the merchant environment 1304 associated with the token access system 1322. Some embodiments for authenticating the user and for determining the user's authorization are described above with respect to the blocks 502 and 504.

At decision block 1404, the token access system 1322 determines whether the set of words match a set of random words associated with a token. If the set of words do not match the set of random words, the token access system 1322 rejects the user, or the user's request to access the token, at the block 1406. In some embodiments, the decision block 1404 can include some or all of the embodiments described above with respect to the decision block 510. Further, in some embodiments, the block 1406 can include some or all of the embodiments described above with respect to the block 506.

If the token access system determines that the set of words match a set of random words associated with the token, the token access system 1322 can provide the user with the token associated with the set of random words at block 1408. In some cases, the block 1408 may further include determining whether the token is associated with the user prior to providing the user with the token. In some embodiments, the block 1408 may include providing the user with access to the token with or without providing the user with the token. For example, the token access system 1322 may inform the user that the user has obtained access to the token and that in response to the user providing transaction details, the token access system 1322 can complete the transaction for the user using the token. Advantageously, in certain embodiments, the third-party merchant 162 can complete a transaction using a token and CHD associated with the token without ever viewing or accessing the token or CHD.

At block 1410, the token access system can disassociate the set of random words from the token and the user. In some cases, the block 1410 can include disassociating the token with the user (e.g., the third-party merchant 162). In certain embodiments, some or all of the embodiments described above with respect to the block 518 may apply to the block 1410.

Third Example Process for Accessing Cardholder Data

Figure 15:
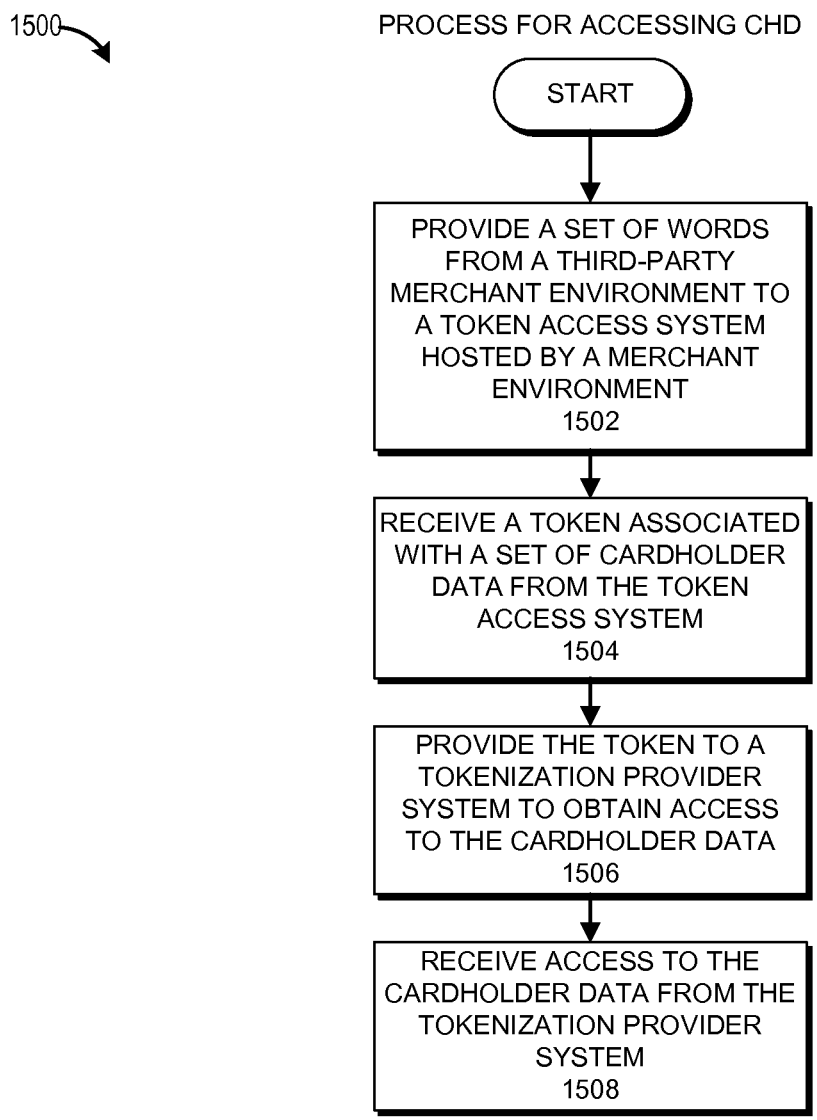
FIG. 15 illustrates a flow diagram for a third example embodiment of a process for accessing cardholder data.

FIG. 15 illustrates a flow diagram for a third example embodiment of a process 1500 for accessing cardholder data. The process 1500 can be implemented by any system that can provide a second merchant (e.g., the third-party merchant 162) with access to CHD associated with a token, which was created in response to a first merchant (e.g., the merchant 142) providing the CHD to the system or a related system. For example, the process 1500, in whole or in part, can be implemented by one or more of the CHD access system 1324, the token access client 1390, the computing system 1364, the token access system 124, and the token access system 1322. Although any number of systems, in whole or in part, can implement the process 1500, to simplify discussion, the process 1500 will be described as being generally implemented by the computing system 1364.

The process begins at block 1502 where, for example, the computing system 1364 at the third-party merchant environment 1306 using, for example, the token access client 1390 provides a set of words to a token access system 1322 hosted by the merchant environment 1304. In certain embodiments, the block 1502 may be part of an authentication process for accessing the token access system 1322. Examples of authentication elements and processes that may be used herein are described in "The OAuth 2.0 Authorization Protocol draft-ietf-oauth-v2-25," dated Mar. 8, 2012, located at http://tools.ietf.org/html/draft-ietf-oauth-v2-25 (last accessed Mar. 23, 2012) and is hereby incorporated by reference herein in its entirety. In other embodiments, the block 1502 may include an authentication process for authenticating the third-party merchant 162. The set of words may then be used to identify the specific token to be accessed.

In some embodiments, the block 1502 may include a process for determining the token access system and/or merchant environment to access or to provide the set of words. In some cases, determining the merchant environment to access is based on the set of words. In other cases, the merchant environment is selected by the third-party merchant 162. Alternatively, the merchant environment is preselected by, for example, an administrator. In some cases, the process 1500 may be performed in response to a system hosted by the merchant environment 1304, such as the token access system 1322, communicating with a system hosted by the third-party merchant environment 1306, such as the computing system 1364. In some cases, the merchant environment may be selected via merchant specific identifiers, such as a merchant account number. The merchant account number may be specified by a user associated with the third-party merchant environment 1306 (e.g., the third-party merchant 162). Alternatively, the merchant account number may be associated with the set of words or provided by the merchant who provided the set of words to the third-party merchant environment 1306.

At block 1504, the computing system 1364 receives a token associated with a set of cardholder data from the token access system 1322. In some embodiments, receiving the token may include receiving a copy of the token. Alternatively, or in addition, receiving the token may include receiving access to the token and/or permission to use the token, but in some embodiments does not include receiving a copy of the token. Advantageously, in certain embodiments, the third-party merchant 162 can use the token without the token being transmitted from the merchant environment 1304, or a system associated with the merchant environment 1304, to the third-party merchant environment 1306.

At block 1506, the computing system 1364 using, for example, the CHD access system 1324 may provide the token to a tokenization provider system 1302 to obtain access to the CHD associated with the token. At block 1508, the computing system 1364 may receive access to the CHD from the tokenization provider system 1302. In some cases, receiving access to the CHD may include receiving a copy of the CHD. The copy of the CHD may include an encrypted copy of the CHD, which may be decrypted by, for example, the CHD access system 1324. In other cases, receiving access to the CHD may include obtaining permission to use the CHD at the tokenization provider system 1302. In such cases, the third-party merchant 162 using, for example, the computing system 1364 or POS 166 may provide transaction details to the tokenization provider system 1302. The tokenization provider system 1302 may then complete the transaction on behalf of the third-party merchant 162. Advantageously, in some embodiments, the third-party merchant 162 can complete a transaction using the CHD without obtaining a copy of the CHD.

In some embodiments, the third-party merchant 162 may provide the transaction details to, for example, the token access system 1322 hosted by the merchant environment 1304. The token access system 1322 may then provide the transaction details and the token to the tokenization provider system 1302, which may complete the transaction on behalf of the third-party merchant 162. Advantageously, in some embodiments, the third-party merchant 162 can complete a transaction using the CHD without ever obtaining a copy of the CHD or the token associated with the CHD.

Example of a Token Access System

Figure 16:
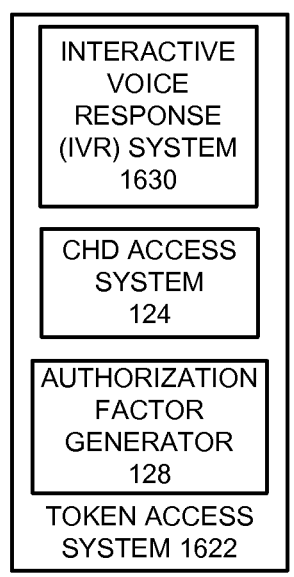
FIG. 16 illustrates an example embodiment of a token access system.

FIG. 16 illustrates an example embodiment of a token access system 1622. The token access system 1622 can include any type of system that can be used by a tokenization provider system (e.g., the tokenization provider system 102) or a merchant environment (e.g., the merchant environment 1304) to provide a user or merchant with access to a token and/or CHD associated with a token. In some embodiments, the token access system 1622 can include some or all of the embodiments described above with respect to the token access system 122 and/or the token access system 1322.

The token access system 1622 can include an authorization factor generator 128, a CHD access system 124, and an interactive voice response (IVR) system 1630. The authorization factor generator 128 and the CHD access system 124 of token access system 1622 can include some or all of the embodiments previously described with respect to the authorization factor generator 128 and the CHD access system 124.

The IVR system 1630 can include any system that enables a user to interact with the token access system 1622 using voice input. The voice input can include voice commands as well as any information or data that can be provided by voice. Further, the IVR system 1630 can prompt a user to provide commands and/or data via an audio prompt. Although configured for voice input and audio output, in some embodiments, the IVR system 1630 can be configured to interact with a user via other methods and mechanisms. For example, in some cases, the IVR system 1630 can be an interactive voice and video response (IVVR) system capable of interacting with a user via both voice and video. In some cases, the IVR system 1630 can interact with the user via static images and/or an interactive user interface, which may include audio, video, or images.

A user can use one or more of a telephone, dumbphone, a feature phone, a smartphone, and a computing device (e.g., a laptop, desktop, tablet, etc.) to interact with the IVR system 1630. For example, a user can use a system or service that utilizes Voice over Internet Protocol (VoIP) to interact with the IVR system 1630. Further, in some embodiments, a computer or computing system can interact with the IVR system 1630. Advantageously, in certain embodiments, configuring a computer system to interact with the IVR system 1630 enables interacting with the IVR system 1630 using an automated system and/or process.

Example of an IVR Based Token Sharing Process

Figure 17:
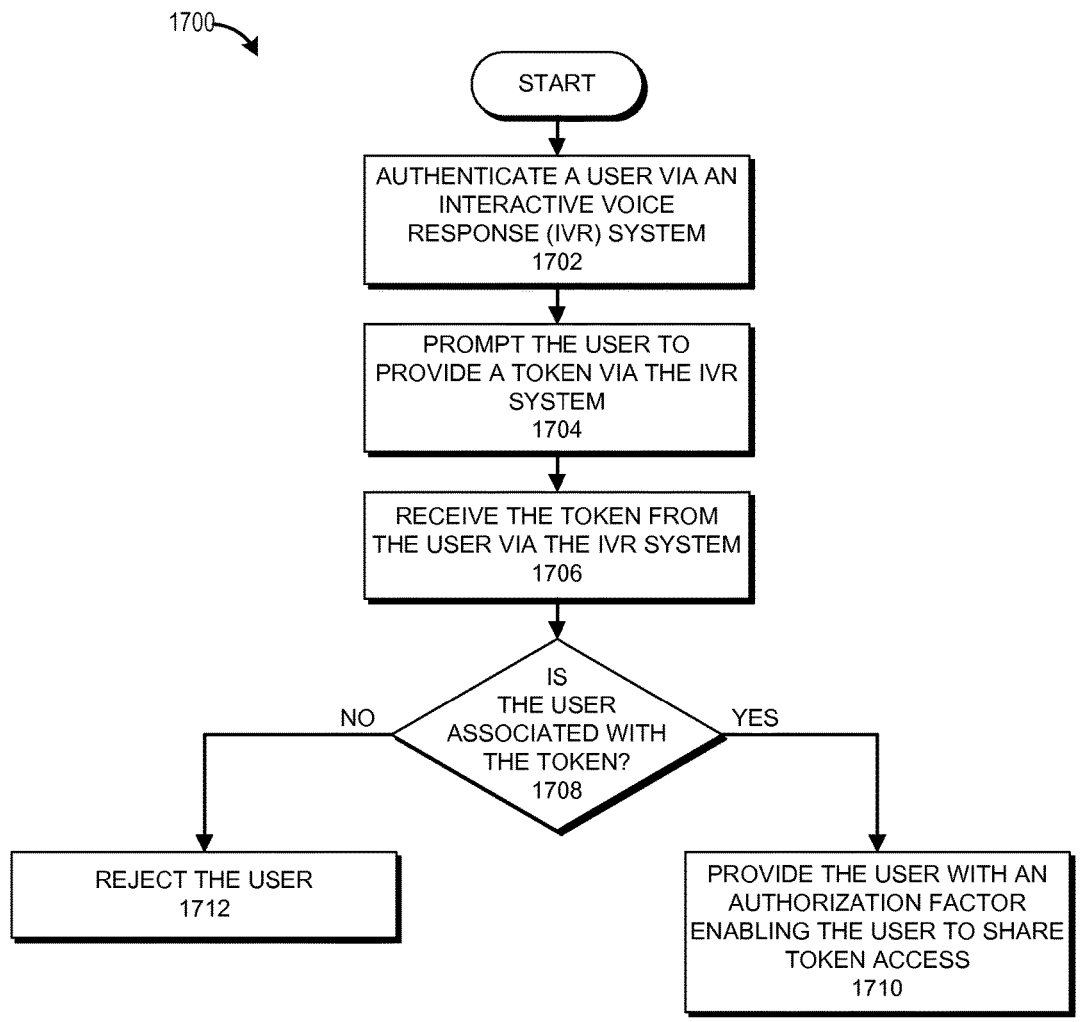
FIG. 17 illustrates a flow diagram for an example embodiment of an interactive voice response (IVR) based token sharing process.

FIG. 17 illustrates a flow diagram for an example embodiment of an interactive voice response (IVR) based token sharing process 1700. The process 1700 can be implemented by any system that can interact with a system or user via voice input and audio output to enable a user to share a token with another user or entity. For example, the process 1700, in whole or in part, can be implemented by one or more of the token access system 1622, the IVR system 1630, the token access system 122, and the token access system 1322. Although any number of systems, in whole or in part, can implement the process 1700, to simplify discussion, portions of the process 1700 will be described with respect to particular systems.

The process begins at block 1702 where, for example, the token access system 1622 authenticates a user via the IVR system 1630. Authenticating the user can include requesting the user provide information associated with the user to the IVR system 1630. This information can include a unique identifier (e.g., a social security number, a unique account number, etc.), a pin number, an answer to a security question, a name, or any other information that can be used to help identify the user or verify the user's specified identity. If the user is not successfully authenticated, the process 1700 may end, provide the user an opportunity to re-authenticate, and/or alert an administrator. Generally, the user is a human. However, in some cases, the user may be an automated system or a computing system.

At block 1704, the IVR system 1630 prompts the user to provide a token. The IVR system 1630 receives the token from the user at block 1706. This token can include any string of alphanumeric characters and symbols that may be supplied via a phone and/or keyboard and can be associated with CHD. At decision block 1708, the token access system 1622 determines whether the user is associated with the token. In some embodiments, determining whether the user is associated with the token can include determining whether the user is identified as an owner of the token. Further, in some cases, determining whether the user is associated with the token can include determining whether the user is authorized to share the token with other users.

If the user is associated with the token, the IVR system 1630 provides the user with the authorization factor at block 1710. Providing the authorization factor to the user enables the user to share token access with a another user, or third-party user, to whom the user provides the authorization factor. In some embodiments, the third-party user may be prevented from accessing the token regardless of whether the third-party user has the authorization factor. For example, if the third-party user is not registered with the token access system 1622, having access to the authorization factor may not be sufficient to use the token or access CHD associated with the token. In some embodiments, the block 1710 can include the user identifying or registering the third-party user to whom the user intends to share the authorization factor thereby enabling the token access system 1622 to verify that a user providing the authorization factor to the token access system 1622 is authorized to access the token. Advantageously, in certain embodiments, registering the intended recipient or third-party user with the token access system 1622 creates a multi-factor authorization system as the third-party user should be registered with the token access system 1622 and should have access to the authorization factor before accessing a token.

The authorization factor provided at the block 1710 can include any type of authorization factor that may be provided by an IVR system 1630. For example, the authorization factor can include a set of words, characters, numbers, or sounds. Moreover, in some cases, the authorization factor provided by the IVR system can include some or all of the embodiments previously described with respect to authorization factors. For example, the authorization factor may be associated with a theme, such as colors, animals, or places. In some cases, an authorization factor may be easier to remember than a token. Thus, in certain cases, a user may use the process 1700 to obtain an authorization factor for his or her own use to facilitate accessing a token. Moreover, in certain cases, the authorization factor may be used as the token.

If the user is not associated with the token, the token access system 1622 rejects the user at block 1712. Rejecting the user can include the IVR system 1630 informing the user that the user is not authorized to access the token. In some embodiments, the block 1712 can include some or all of the embodiments described above with respect to the blocks 506 and 1406.

Example of a Token Generation Process

Figure 18:
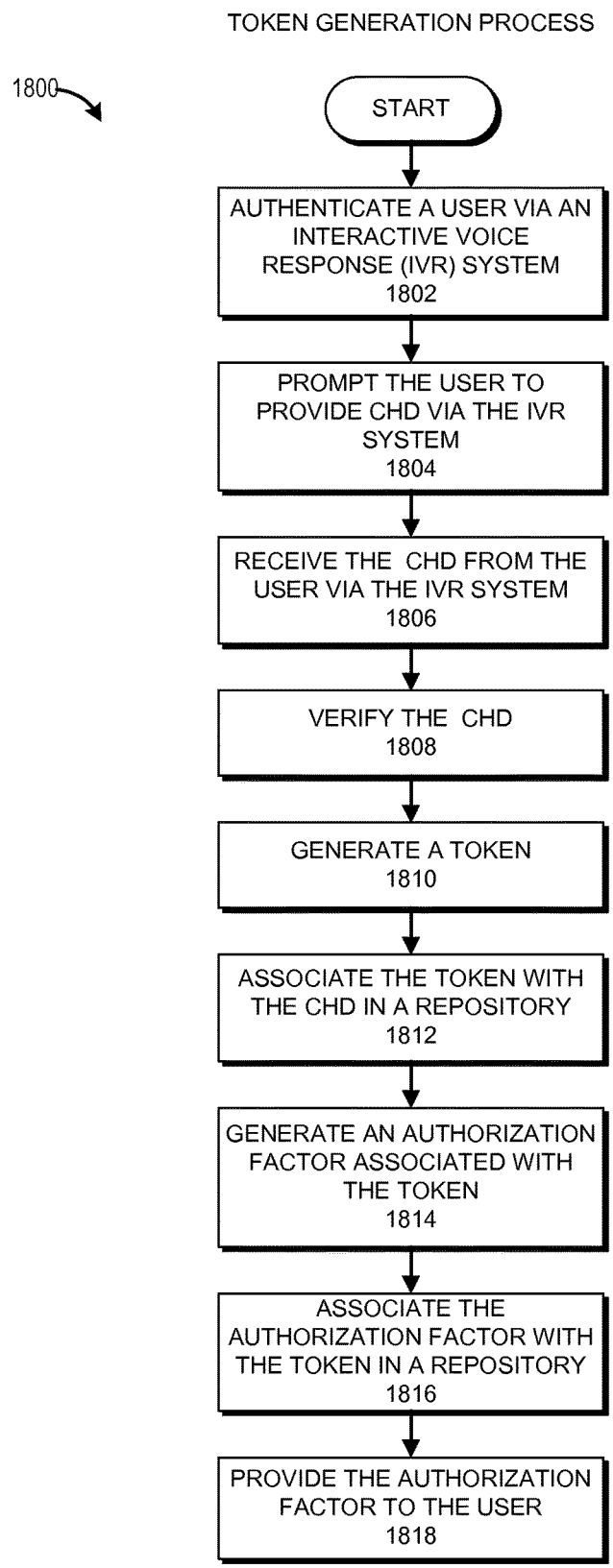
FIG. 18 illustrates a flow diagram for an example embodiment of a token generation process.

FIG. 18 illustrates a flow diagram for an example embodiment of a token generation process 1800. The process 1800 can be implemented by any system that can generate a token to be associated with CHD received via an IVR system. For example, the process 1800, in whole or in part, can be implemented by one or more of the token access system 1622, the IVR system 1630, the token access system 122, and the token access system 1322. Although any number of systems, in whole or in part, can implement the process 1800, to simplify discussion, portions of the process 1800 will be described with respect to particular systems.

The process begins at block 1802 where, for example, the token access system 1622 authenticates a user via the IVR system 1630. Authenticating the user can include requesting the user provide information associated with the user to the IVR system 1630. This information can include a unique identifier (e.g., a social security number, a unique account number, etc.), a pin number, an answer to a security question, a name, or any other information that can be used to help identify the user or verify the user's specified identity. If the user is not successfully authenticated, the process 1800 may end, provide the user an opportunity to re-authenticate, and/or alert an administrator. Generally, the user is a human. However, in some cases, the user may be an automated system or a computing system. In certain embodiments, the block 1802 is optional.

At block 1804, the IVR system 1630 prompts the user to provide one or more pieces of CHD. This CHD can generally include any type of CHD, such as a card number, an expiration date, a card security or verification code (e.g., a CVC code, a CVV2 code, a CVC2 code, etc.), a cardholder name, etc. In some cases, the requested CHD may depend on the type of card and/or the entity associated with the token access system 1622 or using the token access system 1622. The IVR system 1630 receives the CHD from the user at block 1806. Subsequent to receiving the CHD, the token access system 1622 verifies the CHD at block 1808. Verifying the CHD can include any process that may be used to verify at least a subset of the CHD. For example, verifying the CHD can include performing one or more algorithmic checks on the CHD, (e.g., a Luhn test), contacting a provider of the card associated with the CHD, and performing a micro-transaction or a small transaction using the CHD. In some embodiments, the block 1808 may be optional.

At block 1810, the token access system 1622 generates a token. In some embodiments, the block 1810 can include some or all of the embodiments described above with respect to the block 204. Further, the token can include any type of token as has previously been described. Typically, the token is unique. However, in some cases, a token may be a duplicate token or a reused token. For example, a token associated with expired CHD may be re-associated with CHD that is not expired. Moreover, although the token generally includes a random or pseudo-random value that is unrelated to the CHD, in some cases, the token may be based, at least in part, on the CHD. For example, the first portion of the token may include a portion of CHD (e.g., the first 4-digits of a card number) or may be generated based on the portion of the CHD.

The token access system 1622 associates the token with the CHD in a repository at block 1812. This repository can include any repository or data store designed to store a relationship between a token and CHD. For example, the repository can include the token/CHD relationship repository 132. In some cases, the block 1812 can include storing the CHD and the token in the repository. In certain embodiments, the block 1812 can include one or more of the embodiments described above with respect to the block 206.

At block 1814, the authorization factor generator 128 generates an authorization factor associated with the token. The authorization factor can include any type of authorization factor as previously described with respect to FIG. 1. Further, in some cases, the authorization factor can include a set of random or pseudorandom words as described with respect to the block 416. For example, the authorization factor may be the following set of four words: green, dog, circle, grape. Generally, the authorization factor is unrelated to the token. However, in some cases, the authorization factor may be generated based, at least in part, on the token. For example, the authorization factor generator 128 may use portions of the token as an index for selecting words or values in a dictionary of available options. This dictionary may be predefined or it may itself be generated as, for example, part of the block 1814. Advantageously, in certain embodiments, the authorization factor can serve as an "anglicized" token or a simplified token that is easier to remember than the token generated at the block 1810, which may include, for example, a string of random letters, numbers, and/or symbols. Moreover, in certain embodiments, the block 1814 can include some or all of the embodiments described with respect to the block 416.

The token access system 1622 associates the authorization factor with the token in a repository at block 1816. This repository may be the same repository, described with respect to the block 1812, that stores the association between the token and the CHD. Alternatively, the authorization factor and token relationship may be stored at another repository, such as the token access repository 134. In certain embodiments, the block 1816 can include some or all of the embodiments described with respect to the block 418. Further, in certain embodiments, the block 1816 can include associating the authorization factor with the user. In such embodiments, the block 1816 may include one or more of the embodiments previously described with respect to the block 420. Moreover, in certain embodiments, the block 1816 can include associating the authorization factor with one or more additional users specified by the user.

At block 1818, the IVR system 1630 provides the authorization factor to the user. The authorization factor may be presented to the user via audio, images, video, or any combination thereof. Further, in some cases, the authorization factor may be provided to one or more additional users whom the user has specified as being authorized to access the token. In certain embodiments, the block 1818 can include one or more of the embodiments described above with respect to the block 422. Instead of, or in addition to, using the IVR system 1630 to prevent the authorization factor to the user the token access system 1622 may provide the authorization factor to the user via any other communication mechanism for providing information to a user. For example, the token access system 1622 can provide the authorization factor to the user via a text message, an email, a voicemail message, or an instant message, to name a few.

Third Example of a Token-Sharing Environment

Figure 19:
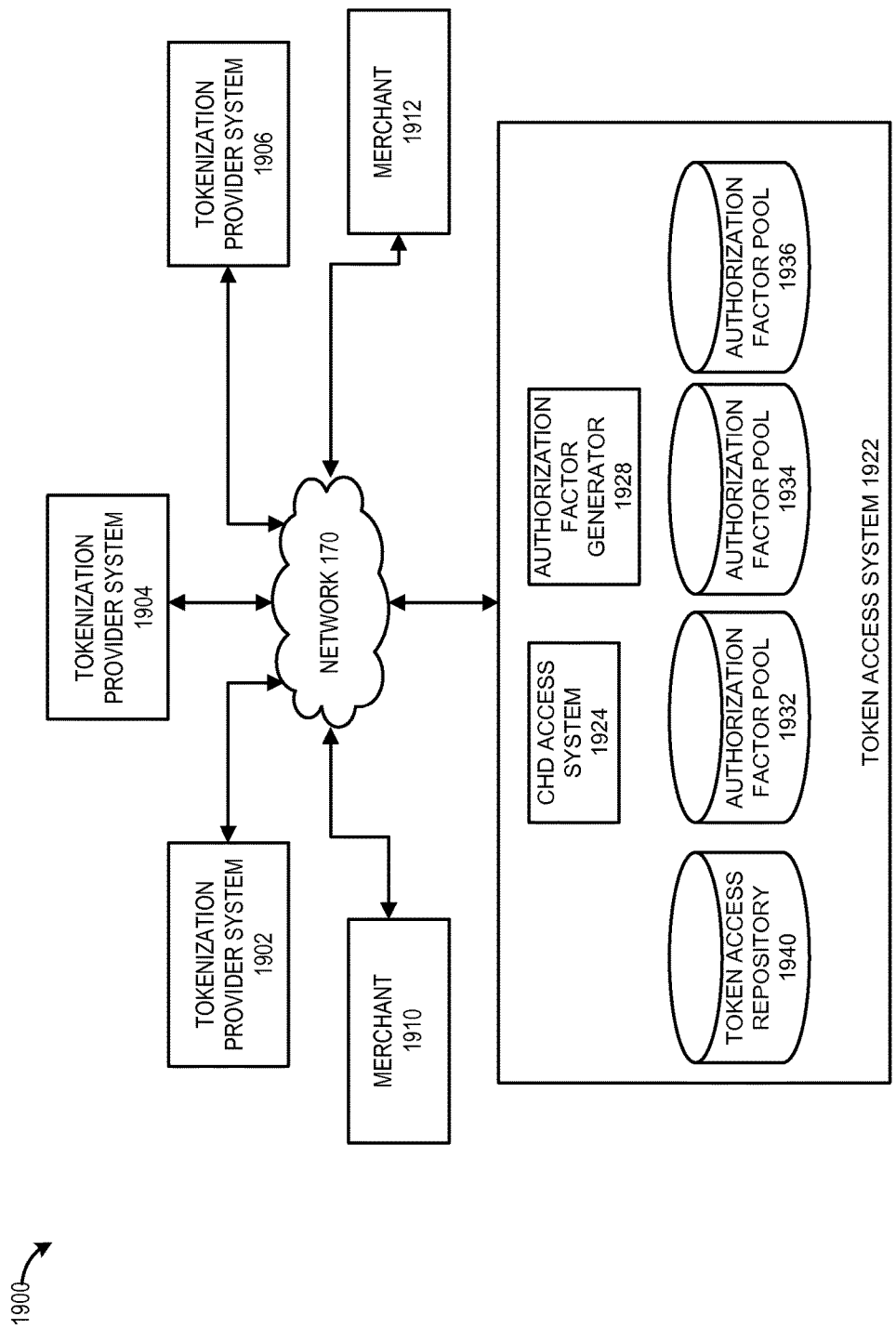
FIG. 19 illustrates an example embodiment of a token-sharing environment.

FIG. 19 illustrates an example embodiment of a token-sharing environment 1900. The token-sharing environment 1900 illustrates an example embodiment of multiple tokenization provider systems (e.g., the tokenization provider systems 1902, 1904, and 1906) sharing access to a single token access system 1922, which enables merchants to share access to tokens created by the tokenization provider systems. Although a single token access system is illustrated, it is possible, in some cases, for the tokenization provider systems to have access to multiple token access systems. Further, although the token access system 1922 is illustrated as a separate system from the tokenization provider systems, it is possible for at least some of the token access system 1922 to be part of the tokenization provider systems.

In some embodiments, the token access system 1922 is operated by a different entity than each of the tokenization provider systems. Alternatively, the token access system 1922 may be part of one of the tokenization provider systems or operated by an entity that operates one of the tokenization provider systems. The remaining tokenization provider systems may then rent or purchase the use of the token access system from the tokenization provider system, or the entity that operates the tokenization provider system. For example, the token access system 1922 may be part of the tokenization provider system 1902, and the operators of tokenization provider systems 1904 and 1906 may contract to use the token access system from the operator of the tokenization provider system 1902. Advantageously, in certain embodiments, the entities that operate the tokenization provider systems 1904 and 1906 may provide the service of enabling their tokens to be shared without managing their own token access system by using the token access system associated with the tokenization provider system 1902.

The tokenization provider systems can communicate with the token access system 1922 via the network 170. Further, the merchants 1910 and 1912 can communicate with the token access system 1922 and the tokenization provider systems via the network 170. In some cases, at least one of the merchants can be a third-party merchant environment (e.g., the third party merchant environment 106) as previously described. In some cases, the merchant 1910 may serve as a third-party merchant to the merchant 1912 and vice versa.

In certain embodiments, the token access system 1922 can create authorization factor pools (e.g., four word pools, image pools, sound pools) that are uniquely associated with one of the tokenization provider systems. Thus, each tokenization provider system can be associated with a unique pool of authorization factors. For example, assuming that the authorization factor is based on sets of words, the tokenization provider system 1902 may be associated with a word pool that includes words starting with letters 'A'-'H', the tokenization provider system 1904 may be associated with a word pool that includes words starting with letters 'I'-'N', and the tokenization provider system 1906 may be associated with a word pool that includes words starting with letters 'O'-'Z'.

The token access system 1922 can include multiple authorization factor pool repositories that can be associated with the tokenization provider systems. Each of the tokenization factor pool repositories can include the authorization factors that can be used or randomly selected for enabling a merchant, or third-party merchant, to obtain access to a token from a particular tokenization provider system. For example, the tokenization provider system 1902 may be associated with the authorization factor pool 1932, the tokenization provider system 1904 may be associated with the authorization factor pool 1934, and the tokenization provider system 1906 may be associated with the authorization factor pool 1936. In some embodiments, each of the authorization factor pools may be stored in the same repository. Alternatively, each of the authorization factor pools may be stored in separate repositories, which may or may not be stored at the same location. In some embodiments, each authorization factor pool may include different authorization factor types and/or algorithms. For example, the authorization factor pool 1932 may include an algorithm for selecting random words, the authorization factor pool 1934 may include an algorithm for selecting random digits, and the authorization factor pool 1934 may include an algorithm for selecting a combination of images and pass-phrases.

Advantageously, in certain embodiments, by associating different authorization factor pools with each tokenization provider system, tokens may be further protected because the authorization factors would be specific to the tokenization provider system associated with the authorization factor pool. Thus, for example, an authorization factor generated based on one authorization factor pool would not be meaningful or understood by tokenization provider systems not associated with the authorization factor pool.

Each time a merchant, such as merchant 1910, requests an authorization factor to be provided to a third-party merchant, such as the merchant 1912, to enable the third-party merchant to access a token, the token access system 1922 can determine which tokenization provider system generated the token. The authorization factor generator 1928 can then generate an authorization factor, such as a set of words, using the authorization factor pool associated with the tokenization provider system that generated the token. For example, if the token access system determines that the token identified by the merchant 1910 was generated by the tokenization provider system 1904, the authorization factor generator 1928 can generate an authorization factor using authorization factor pool 1934.

In some embodiments, the authorization factor is associated with the token or a reference to the token at the token access repository 1940. Alternatively, or in addition, the authorization factor may be associated with the token or the reference to the token at the authorization factor pool corresponding to the tokenization provider system that generated the token.

As previously described, in certain embodiments a third-party merchant provides the authorization factor to the token access system 1922 to obtain access to the corresponding token associated with the authorization factor. The token access system 1922 can determine the tokenization provider system communicate with to obtain access the token corresponding to the authorization factor based on the authorization factor. For example, if the authorization factor is a set of words, and each of the words starts with a letter from 'A'-'H' the token access system 1922 can determine that it should access the tokenization provider system 1902. In some embodiments, the merchant attempting to obtain access to the token can specify the tokenization provider system when providing the authorization factor. The token access system 1922 can then determine if the selected tokenization provider system is the tokenization provider system associated with the authorization factor. If so, the token access system 1922 can proceed with a process (e.g., the process 500) for granting the merchant with access to the token, or associated CHD. If the token access system determines that the user or third-party merchant identified the wrong tokenization provider system, the token access system 1922 can prevent access to the requested token or CHD.

In some embodiments, after obtaining access to the token corresponding to an authorization factor, the token access system 1922 can provide the third-party merchant with access to the corresponding CHD using the CHD access system 1924, which can include some or all of the embodiments previously described with respect to the CHD access system 124 and/or 1324. Alternatively, or in addition, the tokenization provider system that generated the token provides access to the CHD associated with the token. As previously described, providing access to a token and/or CHD can, in some cases, include providing a user or merchant with a copy of the token and/or CHD. In other cases, providing access to a token and/or CHD can involve enabling a user or merchant to use the token and/or CHD without enabling the user or merchant to view the token and/or CHD.

Third Example of a Token Provisioning Process

Figure 20:
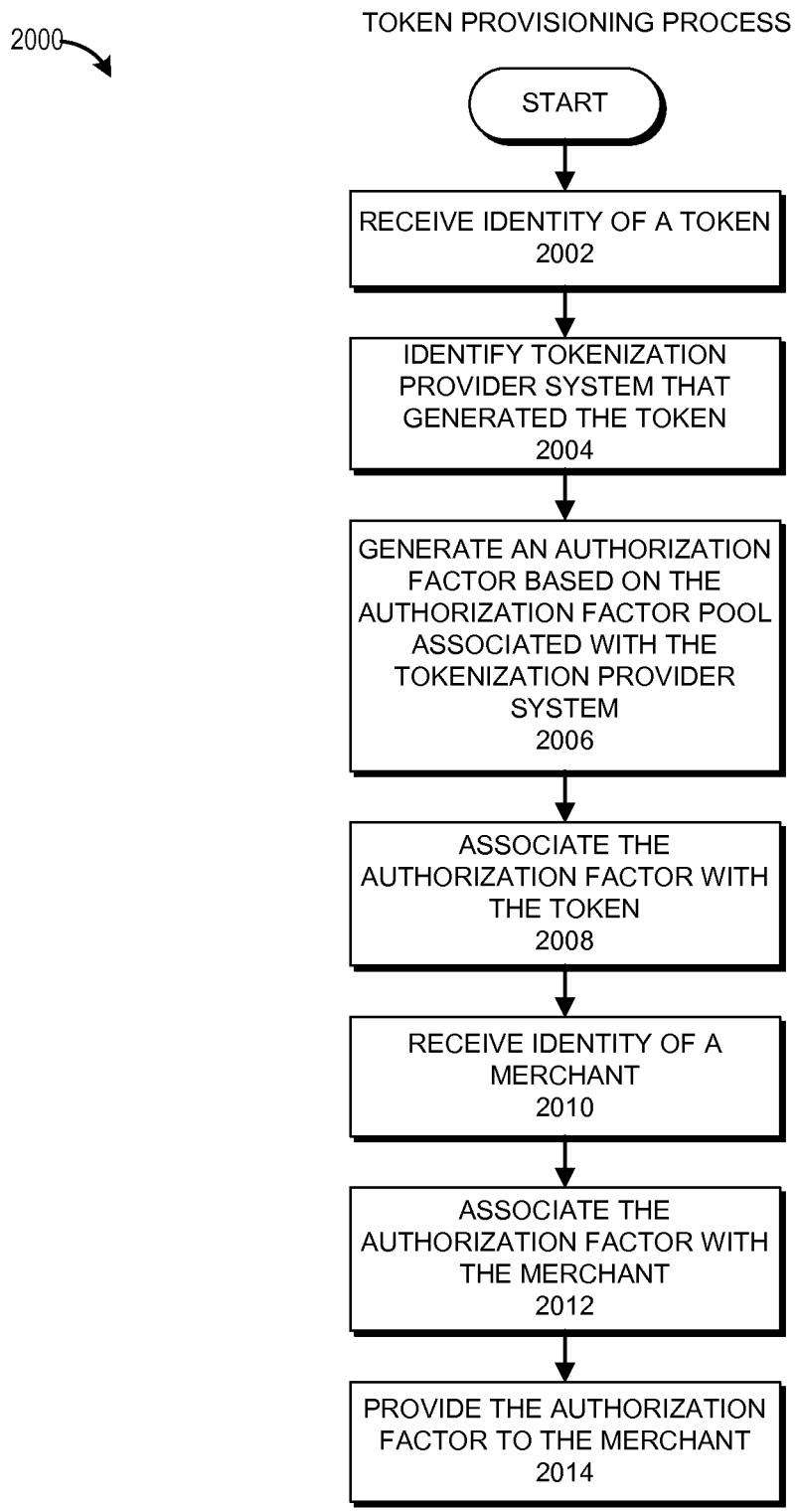
FIG. 20 illustrates a flow diagram for a third example embodiment of a token provisioning process.

FIG. 20 illustrates a flow diagram for a third example embodiment of a token provisioning process 2000. The process 2000 can be implemented by any system that can associate a token corresponding to CHD of a cardholder with a merchant other than the merchant that caused the token to be created. For example, the process 2000, in whole or in part, can be implemented by one or more of a tokenization provider system (e.g., the tokenization provider system 1922), a token access system 1922, an authorization factor generator 1928, the token access system 122, the CHD access system 124, the gateway 126, etc. Although any number of systems, in whole or in part, can implement the process 2000, to simplify discussion, the process 2000 will be described as being generally implemented by specific systems. In some embodiments, the process 2000 can be used to provide either a merchant, or an employee of the merchant or the merchant environment with access to a token or CHD associated with the token.

The process 2000 begins at block 2002, where, for example, the token access system 1922 receives the identity of a token from a merchant (e.g., the merchant 1910). In some embodiments, the block 2002 can include some or all of the embodiments as previously described for receiving the identity of a token, such as the embodiments described with respect to the block 408. Further, in some embodiments, the process 2000 may include identifying the merchant, or user, and determining whether the merchant is authorized to grant token access, as described previously with respect to, for example, the process 400.

At bock 2004, the token access system 1922 identifies a tokenization provider system (e.g., the tokenization provider system 1922) that generated the token identified at the block 2002. In some embodiments, the token access system 1922 may identify the tokenization provider system based on the identified token, data received from the merchant, information stored in one or more repositories (e.g., the token access repository 1940), by querying one or more tokenization provider systems or by any other method for identify a tokenization provider system that generated a token.

At block 2006, the authorization factor generator 1928 generates an authorization factor based on the authorization factor pool associated with the tokenization provider system identified at the block 2004. For example, assuming the tokenization provider system 1922 is associated with the authorization factor pool 1932, and that the token identified at the block 2002 was generated by the tokenization provider system 1922, the authorization factor generator 1928 may generate the authorization factor based on an algorithm or pool of eligible authorization factors stored at the authorization factor pool 1932. Generating the authorization factor can include selecting an authorization factor, either randomly, pseudo-randomly, or programmatically based on an algorithm. These authorization factors can include any type of authorization factor as previously described with respect to, for example, FIG. 1 and/or the block 416. For example, the authorization factor can be a set of one or more random words, or a set of images.

At block 2008, the token access system 1922, or the authorization factor generator 1928, associates the authorization factor with the token. In some embodiments, the association between the authorization factor and the token may be stored at the token access repository 1940. In other embodiments, the association may be stored at the authorization factor pool associated with the tokenization provider system that generated the token. Alternatively, or in addition, the association may be stored at the tokenization provider system that generated the token. Further, in such cases, the token access system 1922 may provide the authorization factor to the tokenization provider system, and the tokenization provider system may associate the authorization factor with the token. In some embodiments, the block 2008 may include some or all of the embodiments previously described with respect to, for example, the block 418.

At block 2010, the token access system 1922 receives the identity of a merchant (e.g., the merchant 1912). Generally, although not necessarily, the merchant identified at the block 2010 differ from the merchant that provided the identity of the token at the block 2002. In some embodiments, the block 2010 may include some or all of the embodiments previously described with respect to, for example, the block 410. Further, as previously described with, for example, the process 400, the process 2000 may, in some embodiments, include determining whether the merchant identified at the block 2010 is authorized to access tokens.

The token access system 1922, at block 2012, associates the authorization factor with the merchant identified at the block 2010. In some embodiments, the tokenization provider system that generated the token may perform the block 2012 in response to receiving the identity of the merchant from the user and/or the token access system 1922. In some embodiments, the block 2012 may include some or all of the embodiments previously described with respect to, for example, the block 420.

At block 2014, the token access system 1922 provides the authorization factor to the merchant identified at the block 2010. In some embodiments, the token access system 1922 provides the authorization factor to the merchant that identified the token at the block 2002, who can then provide the authorization factor to the merchant identified at the block 2010. In some embodiments, the block 2014 may include some or all of the embodiments previously described with respect to, for example, the block 422.

Fourth Example Process for Accessing Cardholder Data

Figure 21:
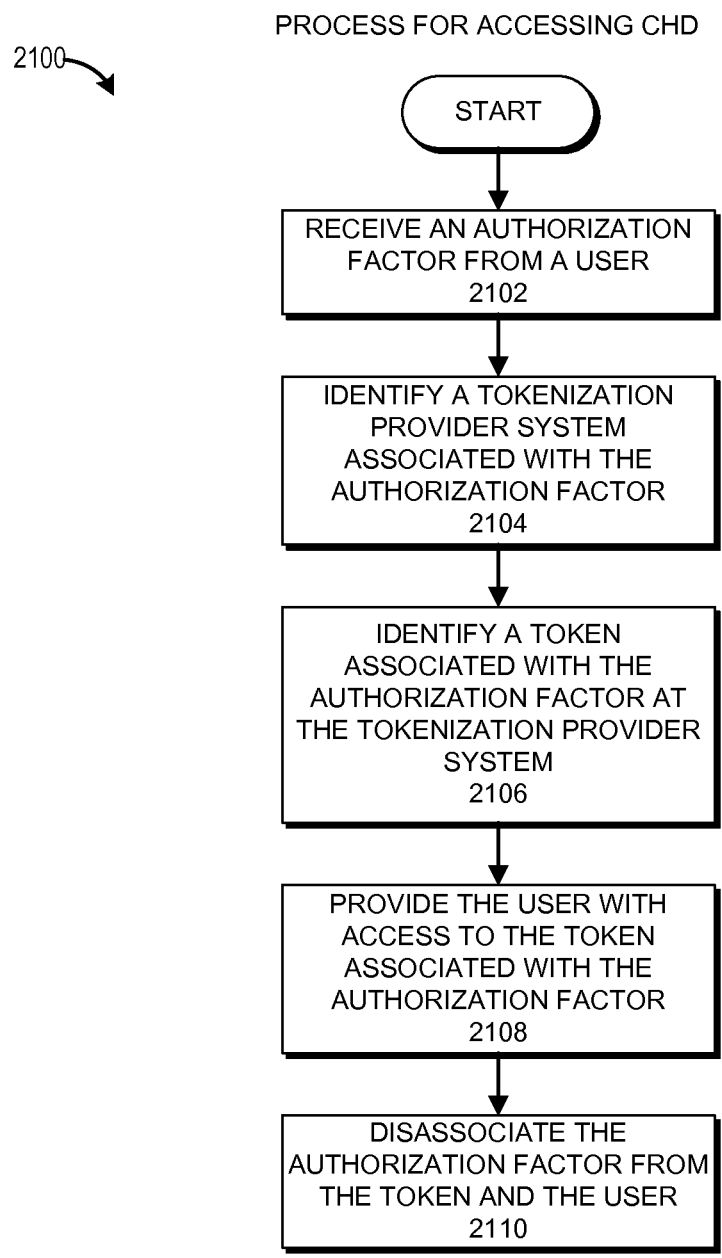
FIG. 21 illustrates a flow diagram for a fourth example embodiment of a process for accessing cardholder data.

FIG. 21 illustrates a flow diagram for a fourth example embodiment of a process 2100 for accessing cardholder data. The process 2100 can be implemented by any system that can provide a merchant (e.g., the merchant 1912) with access to a token and, in some cases, CHD associated with the token, which was created in response to another merchant (e.g., the merchant 1910) providing the CHD to a tokenization provider system (e.g., the tokenization provider system 1902). For example, the process 2100, in whole or in part, can be implemented by one or more of the token access system 1922, the tokenization provider system 1902, token access system 122, the CHD access system 124, and the gateway 126. Although any number of systems, in whole or in part, can implement the process 2100, to simplify discussion, the process 2100 will be described as being generally implemented by specific systems.

The process 2100 begins at block 2102 where, for example, the token access system 1922 receives an authorization factor from a user (e.g., the merchant 1912, or a representative thereof). In some embodiments, the block 2102 may include some or all of the embodiments previously described with respect to, for example, the block 508. Further, in some embodiments, the process 2100 may include receiving authentication information from the user and determining whether the user is authorized to access the token access system 1922 or a tokenization provider system associated with the authorization factor and/or corresponding token, as described previously with respect to, for example, the process 500.

At block 2104, the token access system 1922 identifies a tokenization provider system associated with the authorization factor. Identifying the tokenization provider system associated with the authorization factor can include accessing an authorization factor pool associated with the authorization factor. Determining the tokenization provider system and/or authorization factor pool corresponding to the authorization factor may be based on the authorization factor, the identity of the user, and/or information received from the user. For example, if the authorization factor is a set of images, the token access system 1922 may determine that the relationship between the authorization factor and the token is stored at the authorization factor pool 1934 and that the tokenization provider system 1904 generated the token.

At block 2106, the token access system 1922 identifies a token associated with the authorization factor at the tokenization provider system identified at the block 2104. In some embodiments, the block 2106 may include some or all of the embodiments previously described with respect to, for example, the block 510 and/or 514.

At block 2108, the token access system 1922 provides the user with access to the token associated with the authorization factor. In some embodiments, the block 2108 may include the CHD access system 1924 providing the user with access to the CHD associated with the token. In some cases, the user is provided with access to the token and/or CHD without enabling the user to view the token and/or CHD. Further, in some cases, the block 2108 can include causing the tokenization provider system that generated the token to provide the user with access to the token and/or corresponding CHD. In some embodiments, the block 2108 may include some or all of the embodiments previously described with respect to, for example, the block 514 and/or 516.

The token access system 1922 disassociates the authorization factor from the token and the user at block 2110. Disassociating the authorization factor from the token and the user can include disassociating the authorization factor from the token and/or user at one or more of the authorization factor pool repository and the tokenization provider system corresponding to the token. In some embodiments, the block 2110 may include some or all of the embodiments previously described with respect to, for example, the block 518. In some embodiments, the block 2110 is optional.

Example of a Token-Provisioning Process Using a Machine-Readable Code

Figure 22:
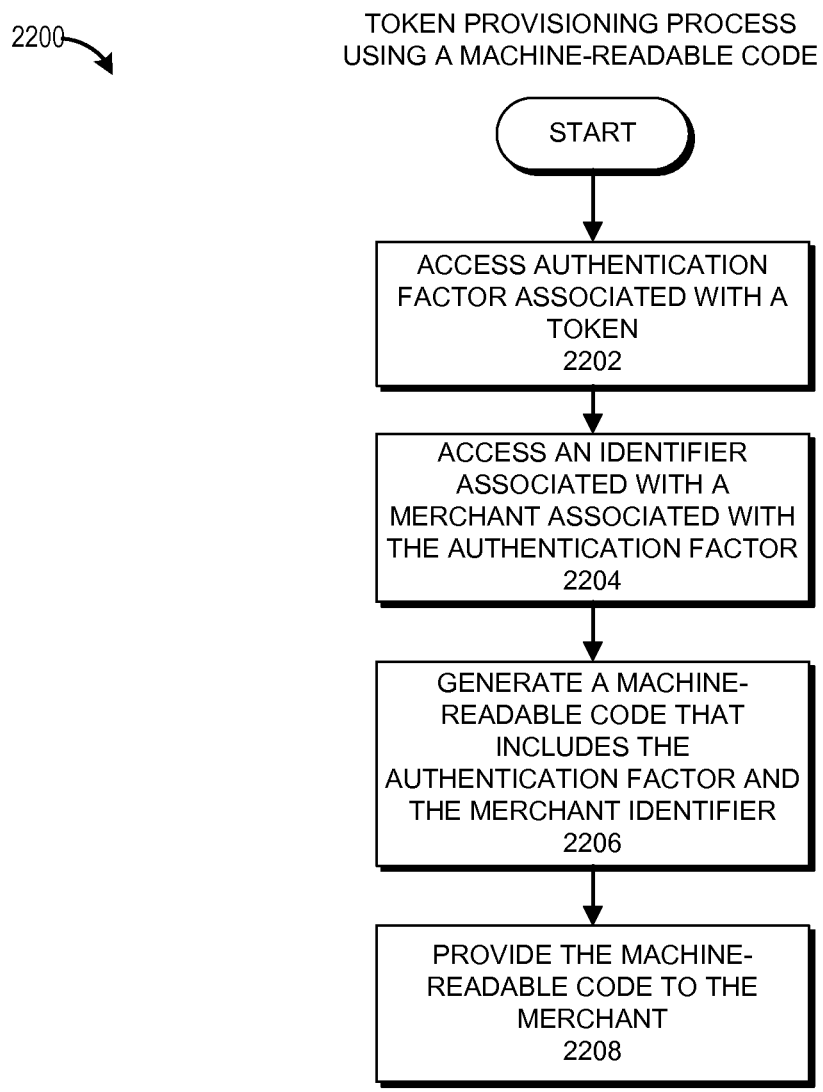
FIG. 22 illustrates a flow diagram for an example embodiment of a token-provisioning process using a machine-readable code.

FIG. 22 illustrates a flow diagram for an example embodiment of a token-provisioning process 2200 using a machine-readable code. The process 2200 can be implemented by any system that can provide a merchant (e.g., the third-party merchant 162 associated with the third-party merchant environment 106) with access to a token and, in some cases, CHD associated with the token, which was created in response to another merchant (e.g., the merchant 142) providing the CHD to a tokenization provider system (e.g., the tokenization provider system 102). For example, the process 2200, in whole or in part, can be implemented by one or more of the tokenization provider system 102, the token access system 122, the CHD access system 124, the authorization factor generator 128, and the gateway 126, to name a few. Although any number of systems, in whole or in part, can implement the process 2200, to simplify discussion, the process 2200 will be described as being generally implemented by specific systems.

The process 2200 begins at block 2202 where, for example, the token access system 122 accesses an authentication factor associated with a token. Accessing the authentication factor can include generating the authentication factor, such as was previously described with respect to the block 416. Further, as has previously been described, the authentication factor can include any type of authentication factor including a set of random or pseudo-random words. In some embodiments, accessing the authentication factor associated with the token can include performing one or more of the previously described embodiments for associating a token with a merchant or a third-party merchant who did not initiate creation of the token, such as the embodiments described with respect to the process 400.

At block 2204, the token access system 122 accesses an identifier associated with a merchant who is associated with the authentication factor. This merchant is typically a third-party merchant (e.g., the third-party merchant 162) who has been granted access, at least temporarily, to a token created for another merchant (e.g., the merchant 142). However, in some cases, the merchant may be the same merchant for whom the token was created.

At block 2206, the token access system 122 generates a machine-readable code that includes the authentication factor and the merchant identifier. In some embodiments, the machine-readable code may include the authentication factor without including the merchant identifier. Further, in some cases, the machine-readable code may include a URL or URI for accessing a network page or webpage associated with the tokenization provider system 102. This webpage may be configured for receiving the authentication factor, for providing access to the token, and/or for providing access to CHD associated with the token. In some cases, the machine-readable code may include an expiration date (and/or time) or a creation date (and/or time).

The machine-readable code can include any type of machine-readable code. In some embodiments, the machine-readable code may include any code that is sufficiently dense so as to be capable of encoding the information described above with respect to the block 2206 within a particular size code. In some cases, the machine-readable code may be a linear code (e.g., U.P.C., MSI, Code 128, etc.) or a stacked linear code (e.g., a stacked barcode). Alternatively, or in addition, the code may be a matrix, or 2D, type code. In certain embodiments, using a matrix type code enables more information to be encoded in the machine-readable code. Some examples of matrix type machine-readable codes that may be used herein include: Quick Response (QR) codes, Aztec Codes, ShotCodes, MaxiCodes, PDF417 codes, SmartCodes In some embodiments, machine-readable code may include a combination of machine-readable codes.

At block 2208, the token access system 122 provides the machine-readable code to the merchant identified at the block 2204 (e.g., the third-party merchant 162). Providing the machine-readable code to the merchant includes emailing the machine-readable code to the merchant, presenting the machine-readable code via a webpage, or presenting the machine-readable code via an application, such as an application for a mobile device or for a POS system.

Example Process for Accessing CHD Using a Machine-Readable Code

Figure 23:
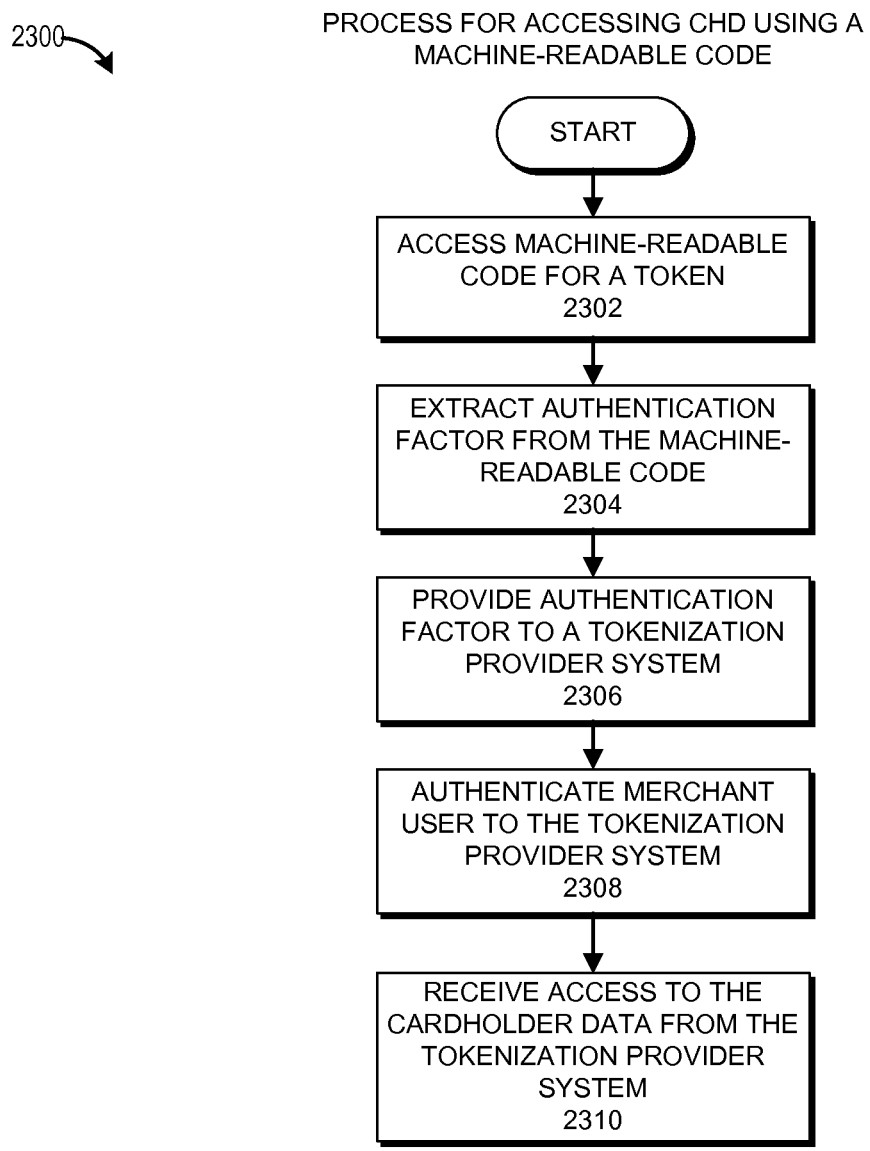
FIG. 23 illustrates a flow diagram for an example embodiment of a process for accessing CHD using a machine-readable code.

FIG. 23 illustrates a flow diagram for an example embodiment of a process 2300 for accessing CHD using a machine-readable code, such as a code received via the process 2200. The process 2300 can be implemented by any system that can access a machine-readable code and extract an authentication factor stored in the machine-readable code. Further, the process 2300 may be performed by any system that can use the authentication factor stored in the machine-readable code to obtain access to a token associated with the authentication factor. For example, the process 2300, in whole or in part, can be implemented by one or more of the POS 166, the computing system 164, a computing system 1364, a token access client 1390, and the CHD access system 1324, to name a few. Although any number of systems, in whole or in part, can implement the process 2300, to simplify discussion, the process 2300 will be described as being generally implemented by specific systems.

The process 2300 begins at block 2302 where, for example, the POS 166 accesses a machine-readable code associated with a token. The POS 166 may include a scanner that can scan the machine-readable code. In some cases, the machine-readable code may be displayed on a screen of a computing system, such as the computing system 164, enabling the machine-readable code to be scanned from the screen. In other cases, the machine-readable code may be scanned from a handheld device (e.g., a smartphone) of a merchant (e.g., the third-party merchant 162).

At block 2304, the POS 166 extracts an authentication factor from the machine-readable code. For instance, the POS 166 may extract a set of words encoded into the machine-readable code. In some cases, the POS 166, or other system capable of scanning the machine-readable code, may scan the machine-readable code and provide information extracted from the machine-readable code to another computing system (e.g., the computing system 164).

At block 2306, the POS 166, or the computing system 164, provides the authentication factor to the tokenization provider system 102. In some cases, the block 2306 includes determining the tokenization provider system that manages the token associated with the authentication factor and providing the authentication factor to the identified tokenization provider system. In some embodiments, providing the authentication factor to the tokenization provider system 102 includes extracting a URL or URI from the machine-readable code, opening a webpage associated with the URL or URI, and automatically providing the authentication factor via the webpage. In other cases, the computing system 164 may display the authentication factor to a user (e.g., the third-party merchant 162) thereby enabling the user to enter the authentication manually into the webpage.

At block 2308, the computing system 164 authenticates the merchant user (e.g., the third-party merchant 162) to the tokenization provider system 102. Authenticating the merchant user can include accessing a digital certificate from a secure area of the computing system 164 and providing the digital certificate to the tokenization provider system 102. Alternatively, or in addition, authenticating the merchant user may include presenting the merchant user with a challenge-response authentication page provided by the tokenization provider system 102 for authentication the merchant user. In some embodiments, the block 2308 may be optional.

At block 2310, the POS 166 receives from the tokenization provider system 102 access to the CHD associated with the token that is associated with the authentication factor provided at the block 2306. In some cases, the receiving access to the CHD includes receiving a copy of the CHD to use for a transaction and/or for a limited period of time. In other cases, receiving access to the CHD includes being able to use the CHD at the tokenization provider system 102 by, for example, providing information for performing a transaction to the tokenization provider system 102, which can then complete the transaction using the CHD on behalf of the merchant user.

Additional Embodiments

Some embodiments of the present disclosure relate to a system for sharing cardholder data (CHD). Further, in some embodiments, the system includes a token access client associated with a first merchant or a first merchant environment. The token access client may be configured to provide a request to obtain access to a token associated with CHD to a token access system associated with a second merchant or a second merchant environment. The request can include an authorization factor. In response to providing the request, the token access client may receive access to the token from the token access system. Further, the token access system can initiate a transaction using the token, thereby enabling the first merchant to initiate the transaction without receiving a copy of the CHD.

In some embodiments, receiving access to the token includes receiving a copy of the token. Further, the token access client may be configured to initiate the transaction by providing transaction information to a tokenization provider system. In some cases, providing the transaction information to the tokenization provider system enables the tokenization provider system to perform the transaction. In some embodiments, the tokenization provider system generated the token.

In some embodiments, receiving access to the token includes receiving authorization to use the token without receiving a copy of the token. Further, the token access client may be configured to initiate the transaction by providing transaction information to the token access system. In some cases, providing the transaction information to the token access system enables the token access system to initiate the transaction.

In some embodiments, the request to obtain access to the token can include the transaction information. Further, the token access client may initiate the transaction by providing the request to the token access system.

In some embodiments, the token access client may be configured to identify or to select a token access system from a plurality of token access systems. In some cases, the token access client may identify or select the token access system based, at least in part, on the authorization factor. Alternatively, or in addition, the token access client may identify or select the token access system based, at least in part, on a user configuration of the token access client. For example, the user may identify the token access system, or a merchant associated with the token access system, at or near a time of the request to obtain token access. As a second example, the user may configure the token access client to identify the token access system based on a set of codes, a type of transaction, or any other information that can be associated with a particular token access system.

Although the authorization factor and the token are described above as including random or pseudo-random values, one or both of the authorization factor and the token may include non-random values. For example, a formula or algorithm may be used to identify one or more words from a dictionary to use as an authorization factor.

Further, as has been described above, obtaining access to a token in some cases can include obtaining a copy of the token. In other cases, obtaining access to the token may include obtaining authorization to use the token, but may not include obtaining a copy of the token. Further, in some cases, obtaining access to the token may include obtaining permission to use the token whether or not a copy of the token is obtained.

Although merchants have been described as employees of merchant environments (e.g., retail establishments or entities), in some cases, merchants may include the merchant environment. Further, in some cases, the merchant may be a single individual, an organization, or a plurality of individuals. Moreover, the merchant may be associated with a brick-and-mortar store, a network-based (e.g., Internet-based) store, or any other provider of goods or services.

A number of the processes described above describe one or more systems interacting with a user. For example, the process 500 describes receiving user authentication information associated with the third-party merchant 162 at the block 502. However, in certain embodiments, some or all of the previously described processes can be performed by one or more systems interacting with one or more additional systems. For instance, again using the block 502 as an example, the user authentication information may be associated with the computing system 164. Alternatively, or in addition, the user authentication information may be associated with the third-party merchant 162 and may be received from the computing system 164, either in response to a user command or through an automated process.

Terminology

A number of computing systems have been described throughout this disclosure. The descriptions of these systems are not intended to limit the teachings or applicability of this disclosure. Further, the processing of the various components of the illustrated systems can be distributed across multiple machines, networks, and other computing resources. For example, the token access system 122, the CHD access system 124, and the authorization factor generator 128 can each be implemented as separate servers or computing systems, or alternatively, as one server or computing system. In addition, two or more components of a system can be combined into fewer components. Further, various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Each of the various illustrated systems may be implemented as a computing system that is programmed or configured to perform the various functions described herein. The computing system may include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computing system includes multiple computing devices, these devices may, but need not, be co-located. The results of the disclosed methods and tasks may be persistently stored by transforming physical storage devices, such as solid state memory chips and/or magnetic disks, into a different state. Each service described, such as those shown in FIG. 3, may be implemented by one or more computing devices, such as one or more physical servers programmed with associated server code.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A system for sharing cardholder data, the system comprising:
a computing system of a first merchant, the computing system comprising computer hardware, the computing system programmed to:
receive cardholder data (CHD) associated with a cardholder;
provide the CHD electronically to a tokenization provider system comprising computer hardware;
discard the CHD;
receive electronically a token from the tokenization provider system associated with the CHD, the token formatted in a format so as to be processed as if the token were the CHD;
receive a request from a user to perform a transaction with a second merchant; and in response to receipt of the request, send a merchant identifier of the second merchant to a tokenization access system;

the tokenization access system comprising computer hardware, the tokenization access system programmed to:

generate an authorization factor in response to receiving the merchant identifier of the second merchant from the computing system of the first merchant;

associate the authorization factor with the token;

generate the machine-readable code by including the authorization factor and the merchant identifier in the machine-readable code; and provide the machine-readable code to the second merchant;

the tokenization provider system programmed to, subsequent to the tokenization access system providing the machine-readable code to the second merchant:

receive the authentication factor from a point-of-sale (POS) system;

retrieve the CHD associated with the token by using the authentication factor; and transmit the CHD to the POS system; and the POS system programmed to:

scan the machine-readable code;

extract the authentication factor from the machine-readable code;

provide the authentication factor to the tokenization provider system;

receive authorization to perform a transaction with the CHD associated with the token that is associated with the authentication factor at the tokenization provider system; and cause the transaction to be performed with the CHD at the tokenization provider system without receiving the CHD.

2. The system of claim 1, wherein the computing system communicates with the tokenization provider system over a network.

* * * * *